US012746472B2

(12) United States Patent
Xie

(10) Patent No.: US 12,746,472 B2
(45) Date of Patent: Sep. 29, 2026

(54) METHOD FOR CONTROLLING GAME OBJECT, NON-TRANSITORY COMPUTER-READABLE STORAGE MEDIUM, AND ELECTRONIC DEVICE THEREOF

(71) Applicant: NETEASE (HANGZHOU) NETWORK CO., LTD., Hangzhou (CN)

(72) Inventor: Jieqi Xie, Hangzhou (CN)

(73) Assignee: NETEASE (HANGZHOU) NETWORK CO., LTD., Hangzhou City (CN)

( * ) Notice: Subject to any disclaimer, the term of this patent is extended or adjusted under 35 U.S.C. 154(b) by 220 days.

(21) Appl. No.: 18/561,334

(22) PCT Filed: Mar. 18, 2022

(86) PCT No.: PCT/CN2022/081774
§ 371 (c)(1),
(2) Date: Nov. 16, 2023

(87) PCT Pub. No.: WO2022/267575
PCT Pub. Date: Dec. 29, 2022

(65) Prior Publication Data

US 2024/0252925 A1 Aug. 1, 2024

(30) Foreign Application Priority Data

Jun. 22, 2021 (CN) ......................... 202110692908.3

(51) Int. Cl.
*A63F 13/56* (2014.01)
*A63F 13/533* (2014.01)

(52) U.S. Cl.
CPC ............ *A63F 13/56* (2014.09); *A63F 13/533* (2014.09)

(58) Field of Classification Search
CPC ........ A63F 13/56; A63F 13/533; A63F 13/58; A63F 13/69; A63F 2300/307; A63F 2300/308
See application file for complete search history.

(56) References Cited

U.S. PATENT DOCUMENTS

2020/0298123 A1* 9/2020 Yang ....................... A63F 13/35
2020/0346113 A1 11/2020 Sun

FOREIGN PATENT DOCUMENTS

CN 108579086 A 9/2018
CN 108579090 A 9/2018
(Continued)

OTHER PUBLICATIONS

[PC Game Goku Michi] No. 44: "Barotrauma" Is the survival sim set in a submarine a werewolf game in multiplayer?, https://web.archive.org/web/20201107233749/https://jp.ign.com/pcgame-ex2/36417/feature/pcbarotrauma, Published on Jul. 12, 2019.
(Continued)

*Primary Examiner* — Thomas H Henry
(74) *Attorney, Agent, or Firm* — Qinghong Xu

(57) ABSTRACT

A method for controlling a game object, including: displaying a first medicine usage recommendation interface on a graphical user interface provided by a first terminal device according to at least one type of status information of the game object and a status medicine currently carried by the game object, where the status medicine is used for adjusting status information of the game object, the first medicine usage recommendation interface comprises at least one status icon corresponding to the status information, a first target status medicine and a first recovery control; displaying a status icon corresponding to the first target status medicine differently from other status icons among the at least one status icon; and adjusting the status information of
(Continued)

the game object by using the first target status medicine in response to a first trigger operation acting on the first recovery control.

19 Claims, 16 Drawing Sheets

(56) References Cited

FOREIGN PATENT DOCUMENTS

| | | | |
|---|---|---|---|
| CN | 111589150 | A | 8/2020 |
| CN | 112494943 | A | 3/2021 |
| CN | 112516594 | A | 3/2021 |
| CN | 113384885 | A | 9/2021 |
| JP | 2002239217 | A | 8/2002 |
| WO | 2019184558 | A1 | 10/2019 |
| WO | 2020199820 | A1 | 10/2020 |

OTHER PUBLICATIONS

Barotrauma—The Medical Doctor's Guide, https://web.archive.org/web/20200918071841/https://gameplay.tips/guides/4358-barotrauma.html, Published on Jun. 10, 2019.
Video, Barotrauma EA-Medical Doctor Tutorial, https://www.youtube.com/watch?v=rn2QFDWfYfo, Published on Jun. 6, 2019.
Notice of Allowance dated Feb. 7, 2024 for Chinese Application No. 202110692908.3.
First Office Action dated Dec. 5, 2023 for Japanese Application No. 2022-573440.
Notice of Allowance dated Jun. 25, 2024 of Japanese Application No. 2022-573440.
International Search Report dated Jun. 15, 2022 of International Application No. PCT/CN2022/081774.

* cited by examiner

METHOD FOR CONTROLLING GAME OBJECT, NON-TRANSITORY COMPUTER-READABLE STORAGE MEDIUM, AND ELECTRONIC DEVICE THEREOF

CROSS REFERENCE TO RELATED APPLICATIONS

The present application is a National Stage of International Application No. PCT/CN2022/081774 filed on Mar. 18, 2022 which claims priority to Chinese Patent Application No. 202110692908.3 entitled "Method and apparatus for controlling game object, storage medium, and electronic device", filed on Jun. 22, 2021, and both the entire contents of which are incorporated herein by reference.

TECHNICAL FIELD

The present disclosure relates to the field of computer technology, and in particular, to a method for controlling a game object, an apparatus for controlling a game object, a computer readable storage medium, and an electronic device.

BACKGROUND

In some related games, when a player is injured in a battle, it is represented as decreasing of a blood volume in the blood bar. In such cases, the player picks up and uses the treatment medicine in the battlefield, so that the blood volume returns to normal.

It should be noted that the information disclosed in the above background part is only used to enhance the understanding of the background of the present disclosure, and therefore may include information that does not constitute the related art known to those of ordinary skill in the art.

SUMMARY

According to a first aspect of the embodiments of the present disclosure, there is provided a method for controlling a game object, where a graphical user interface is provided by a first terminal device, and the method includes:

- displaying a first medicine usage recommendation interface on the graphical user interface according to at least one type of status information of the game object and a status medicine currently carried by the game object, the status medicine being used for adjusting status information of the game object, and the first medicine usage recommendation interface including at least one status icon corresponding to the status information, a target status medicine and a first recovery control, where a status icon corresponding to the target status medicine among the at least one status icon is displayed differentially;
- adjusting the status information of the game object by using the target status medicine in response to a first trigger operation acting on the first recovery control.

According to a second aspect of the embodiments of the present disclosure, there is provided an electronic device, including: a processor and a memory, where the memory stores with a computer-readable instruction, and when the computer-readable instruction is executed by the processor, a method for controlling a game object in any of the foregoing embodiments is implemented.

According to a third aspect of the embodiments of the present disclosure, there is provided a non-transitory computer-readable storage medium with a computer program stored thereon, and when the computer program is executed by a processor, a method for controlling a game object in any of the foregoing embodiments is implemented.

DETAILED DESCRIPTION

Figure 1:
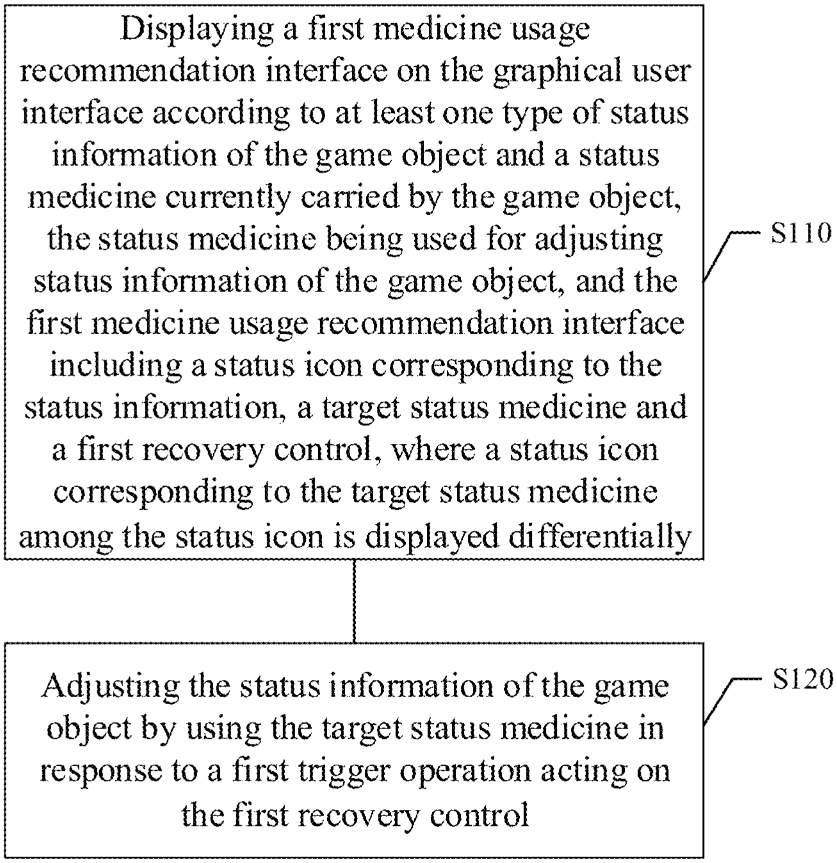
FIG. 1 schematically shows a schematic flowchart of a method for controlling a game object according to an embodiment of the present disclosure.

Example embodiments will now be described more fully with reference to the accompanying drawings. However, Example embodiments can be embodied in many forms and should not be construed as limited to the examples set forth here. By contrast, these embodiments are provided so that the present disclosure will be more comprehensive and complete, and will fully convey the concepts of the example embodiments to those skilled in the art. The described features, structures, or characteristics may be combined in any suitable manner in one or more embodiments. In the following description, numerous specific details are provided to give a thorough understanding of embodiments of the present disclosure. However, those skilled in the art will appreciate that the technical solutions of the present disclosure may be practiced where one or more of the specific details are omitted, or other methods, components, devices, steps, etc., are used. In other instances, commonly known technical solutions are not shown or described in detail to avoid obscuring aspects of the present disclosure.

As used in the present description, the terms “a”, “an”, “the” and “said” are used to indicate that there are one or more elements/components/etc. The terms “comprising” and “including” are used to indicate open inclusion and refer to the existence of additional elements/components/etc., in addition to the listed elements/components/etc. The terms “first” and “second” are only used as markers and do not limit the quantity of their objects.

In addition, the accompanying drawings are merely schematic illustrations of the present disclosure, and are not necessarily drawn to scale. Same reference numerals in the accompanying drawings denote the same or similar parts, and thus repeated descriptions of them will be omitted. Some block diagrams shown in the accompanying drawings are functional entities, and do not necessarily correspond to physical or logically independent entities.

In a scenario where treatment medicines for restoring blood volume and restoring energy are provided at the same time, this method is not applicable, resulting in inefficient battlefield decision-making due to the player thinking too long, thus reducing interaction efficiency and degrading game experience of the player. In addition, the recovery ratios of different treatment medicines are different, and when a treatment medicine with a relatively higher recovery ratio is used, it easily leads to overflow of the blood volume, and finally the player cannot use the treatment medicine. This method requires a high level of mastery of information related to the treatment medicines, and the intelligence and automation level is too low, reducing the accuracy of decision-making for the player in the game and not conducive to returning of the player.

In view of this, there is an urgent need in the art to develop a new method and apparatus for controlling a game object. Therefore, an object of the present disclosure is to provide a method for controlling a game object, an apparatus for controlling a game object, a computer readable storage medium, and an electronic device, so as to overcome the problems of low interaction efficiency and game function defects caused by limitations of the related technologies at least to some extent. Other characteristics and advantages of the present disclosure will become apparent through the following detailed description, or be partially learned by the practice of the present disclosure.

The method for controlling a game object according to an embodiment of the present disclosure may be run on a terminal device or a server. Among them, the terminal device may be a local terminal device. When the method for controlling a game object is run on a server, the method for controlling a game object may be implemented and executed based on a cloud interaction system, where the cloud interaction system includes a server and a client device.

In some embodiments, various cloud applications may be run under the cloud interaction system, for example, a cloud game. Taking a cloud game as an example, a cloud game refers to a game mode based on cloud computing. Under the running mode of the cloud game, the running body of the game program and the game screen presentation body are separated, the storage and running of the method for controlling a game object are completed on the cloud game server, and the function of client device is to receive and send data, as well as present the game screen. For example, the client device may be a display device having a data transmission function close to the user side, such as a mobile terminal, a television, a computer, a palm computer, etc. However, the terminal device for performing information processing is a cloud game server of the cloud. When a game is performed, the player operates the client device to send an operation instruction to the cloud game server, the cloud game server runs the game according to the operation instruction, encodes and compresses the data such as the game screen, returns it to the client device through a network, and finally decodes and outputs the game screen through the client device.

In some embodiments, the terminal device may be a local terminal device. Taking a game as an example, the local terminal device stores with a game program and is used for presenting a game screen. The local terminal device is used for interacting with a player through a graphical user interface (GUI), that is, conventionally downloading and installing a game program through an electronic device. There are a variety of manners for the local terminal device to provide the graphical user interface to the player, for example, the graphical user interface may be rendered and displayed on a display screen of the terminal, or provided to the player through holographic projection. For example, the local terminal device may include a display screen and a processor, the display screen is used for presenting the graphical user interface, the graphical user interface includes a game screen, and the processor is used for running the game, generating a graphical user interface, and controlling the display of the graphical user interface on the display screen.

In some embodiments, the server may be an independent physical server, or may be a server cluster or a distributed system composed of a plurality of physical servers, or may be a cloud server providing basic cloud computing services such as cloud services, cloud databases, cloud computing, cloud functions, cloud storage, network services, cloud communications, middleware services, domain name services, security services, CDN, and big data and artificial intelligence platforms. The terminal may be a smart phone, a tablet computer, a notebook computer, a desktop computer, etc., but is not limited to this. The terminal and the server may be directly or indirectly connected in a wired or wireless communication manner, which is not limited in the present disclosure here.

In view of the problems existing in the related art, the present disclosure provides a method for controlling a game object, where a graphical user interface is provided by a first terminal device, and the first terminal device may be the aforementioned local terminal device, or may be a client device in the aforementioned cloud interaction system. FIG. 1 shows a flowchart of a method for controlling a game object. As shown in FIG. 1, the method for controlling a game object at least includes the following steps.

In step S110, a first medicine usage recommendation interface is displayed on the graphical user interface according to at least one type of status information of the game object and a status medicine currently carried by the game object, the status medicine is used for adjusting status information of the game object, and the first medicine usage recommendation interface includes status icons corresponding to the status information, a target status medicine and a first recovery control, where a status icon corresponding to the target status medicine among the status icons is displayed differentially.

In step S120, in response to a first trigger operation acting on the first recovery control, the status information of the game object is adjusted by using the target status medicine.

In an embodiment of the present disclosure, a first medicine usage recommendation interface is displayed on a graphical user interface, providing an adjustment entry of status information for a player, and improving the method for controlling a game object. Furthermore, status icons corresponding to the status information are displayed in the first medicine recommendation interface, and the target status medicine can be used by the player without considering the corresponding relationship between the status icon and the status information, avoiding the situation of inefficient battlefield decision-making due to the player thinking too long under an emergency battle condition, reducing the waste of the target status medicine caused by the player operating too fast, improving the automation and intelligence level of target status medicine usage, optimizing the player's experience significantly, and improving the returning rate of the player to a certain extent.

Various steps of the method for controlling a game object are described in detail below.

In step S110, a first medicine usage recommendation interface is displayed on the graphical user interface according to at least one type of status information of the game object and a status medicine currently carried by the game object, the status medicine is used for adjusting status information of the game object, and the first medicine usage recommendation interface includes status icons corresponding to the status information, a target status medicine and a first recovery control, where a status icon corresponding to the target status medicine among the status icons is displayed differentially.

In an embodiment of the present disclosure, the status information may be information representing a buff status of the game object, or may be information representing a debuff status of the game object, or may be other status information, which is not specifically limited in the present embodiment.

Correspondingly, the status medicine currently carried by the game object may be a medicine for removing the debuff status of the game object, or may be a medicine for adding the buff status of the game object, or may be a medicine for restoring or adjusting other statuses, which is not specifically limited in the present embodiment.

Furthermore, a first medicine usage recommendation interface may be displayed on the graphical user interface, and the first medicine usage recommendation interface may be displayed on a local region or all regions of the graphical user interface, which is not specifically limited in the present embodiment.

In order to enable the player to grasp the status information of the game object in real time and in detail, the status icons corresponding to the status information may be displayed in the first medicine usage recommendation interface. For example, when the status information is information representing the debuff status of the game object, the status icons corresponding to the debuff status such as hand fracture, body overweight, leg pain or the like of the game object can be displayed in the first medicine usage recommendation interface.

Furthermore, the status icon corresponding to the target status medicine may be displayed differentially from the other status icons.

Therefore, the target status medicine may also be displayed in the first medicine usage recommendation interface. The target status medicine may be determined in the status medicine currently carried by the game object according to a status medicine recommendation rule. Moreover, the target status medicine is used for adjusting the status of the current game object.

Figure 2:
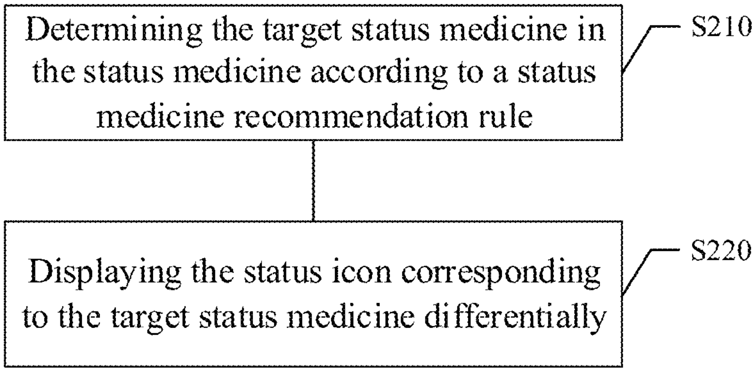
FIG. 2 schematically shows a schematic flowchart of a method for displaying a status icon corresponding to a target status medicine differentially according to an embodiment of the present disclosure.

In some embodiments, FIG. 2 shows a schematic flowchart of a method for displaying a status icon corresponding to a target status medicine differentially. As shown in FIG. 2, the method at least includes the following steps. In step S210, a target status medicine is determined in the status medicine according to a status medicine recommendation rule.

Figure 3:
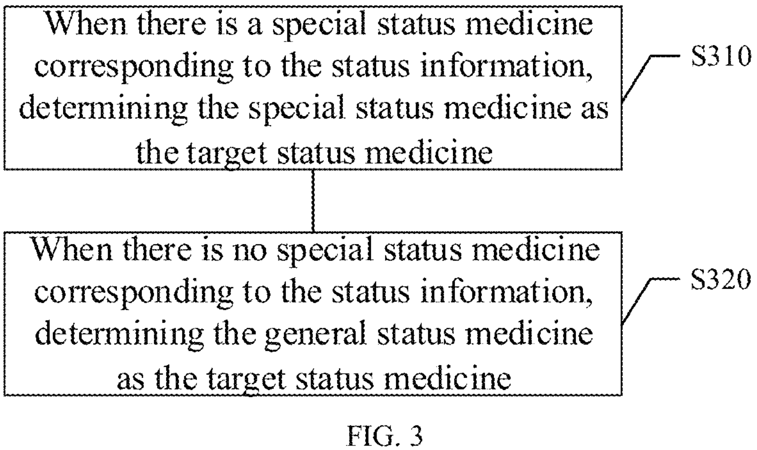
FIG. 3 schematically shows a schematic flowchart of a method for determining a target status medicine according to an embodiment of the present disclosure.

In some embodiments, the status medicine includes a special status medicine and a general status medicine. FIG. 3 shows a schematic flowchart of a method for determining a target status medicine. As shown in FIG. 3, the method at least includes the following steps. In step S310, when there is a special status medicine corresponding to the status information, the special status medicine is determined as the target status medicine.

Among them, the special status medicine is a medicine for adjusting a single piece of status information of the game object, and the general status medicine is a medicine for adjusting all status information of the game object. Generally, however, the price of the special status medicine is less than the price of the general status medicine. Therefore, for the status information of the game object, the priority of the special status medicine is higher than that of the general status medicine.

Furthermore, by judging on the status medicine currently carried by the game object, it is determined whether there is the special status medicine corresponding to the status information or not. When the game object currently carries the special status medicine, the special status medicine can be determined as the target status medicine.

In step S320, when there is no special status medicine corresponding to the status information, the general status medicine is determined as the target status medicine.

When it is determined that the game object carries no special status medicine by judging on the status medicine currently carried by the game object, the general status medicine can be determined as the target status medicine.

In the present embodiment, the target status medicine is determined according to the judgment result of the status medicine currently carried by the game object. The target status medicine to be used is determined for the player, avoiding the problem of inefficient battlefield decision-making due to the player thinking too long, and improving the automation and intelligence level of controlling a game object.

In step S220, the status icon corresponding to the target status medicine is displayed differentially.

Figure 4:
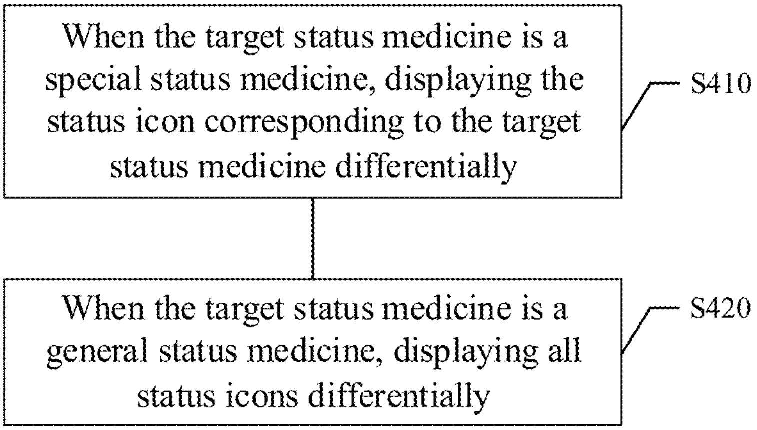
FIG. 4 schematically shows a schematic flowchart of a method for further displaying a status icon differentially according to an embodiment of the present disclosure.

In some embodiments, FIG. 4 shows a schematic flowchart of a method for further displaying a status icon differentially. As shown in FIG. 4, the method at least includes the following steps. In step S410, when the target status medicine is a special status medicine, the status icon corresponding to the target status medicine is displayed differentially.

Since the special status medicine can only adjust one piece of status information of the game object, when the target status medicine is a special status medicine, only the status icon of the status information that the target status medicine can adjust is displayed differentially.

For example, the manner of differential display may be highlight display, flicker display, or enlarged display, or the like. Alternatively, other manners of differential display may be set according to actual situations, which is not specifically limited in the present embodiment.

In step S420, when the target status medicine is a general status medicine, all status icons are displayed differentially.

Since the general status medicine can adjust all status information of the game object, when the target status medicine in a general status medicine, all status icons can be displayed differentially.

Differential display at this time may be a different manner different from the previous display status. In addition to highlight display, flicker display, or enlarged display, the color of the previous display status may also be changed to display, or other manners of differential display may be set according to actual situations, which not specifically limited in the present embodiment.

In the present embodiment, according to different types of the target status medicine, there are correspondingly different manners of differential display, and the "implicit" correspondence relationship between the target status medicine and the status icon is displayed as being "explicit", facilitating the player to check and make decision, and optimizing the game experience of the player.

In addition, a first recovery control may also be displayed in the first medicine usage recommendation interface. The first recovery control is used for the player to control and use the target status medicine.

In step S120, in response to a first trigger operation acting on the first recovery control, the status information of the game object is adjusted by using the target status medicine.

In an embodiment of the present disclosure, in order to facilitate the player to use the target status medicine, the target status medicine may also be selected.

In some embodiments, the target status medicine is in a selected status.

When the target status medicine in the selected status is displayed the on the first medicine usage recommendation interface, a selection control may be provided, and when there is a confirmation mark on the selection control, it is indicated that the target status medicine is in the selected status. In addition, there may be other manners to display the target status medicine in the selected status on the first medicine usage recommendation interface, which is not specifically limited in the present embodiment.

After determining that the target status medicine is selected, the player may use the target status medicine to adjust the status information of the game object through a first trigger operation acting on the first recovery control.

Among them, the first trigger operation may be in the form of a click operation, a long press operation, or a slide operation, etc., which is not specifically limited in the present embodiment.

Certainly, after the target status medicine is selected, the player may further cancel the selected status of the target status medicine in the case of not intending to use the target status medicine.

In some embodiments, in response to a second trigger operation acting on the target status medicine, differential display of the status icon corresponding to the target status medicine is canceled, and the target status medicine is adjusted into an unselected status.

Among them, the second trigger operation may also be in the form of a click operation, a long press operation, or a slide operation, etc., which is not specifically limited in the present embodiment.

After the player acts a second trigger operation, the differential display of the status medicine corresponding to the target status medicine can be canceled, and simultaneously, the target status medicine can be adjusted into an unselected status.

In the present embodiment, the player can cancel the selection of the target status medicine through a second trigger operation, comprehensively displaying the "implicit" correspondence relationship between the target status medicine and the status icon as being "explicit" from the aspect of canceling the selection, providing an autonomous operation entrance of a battlefield decision-making for the player, facilitating the player to make a decision according to the personal demand and the current battlefield demand, and restricting the disadvantages caused by excessively automated use of the target status medicine to a certain extent.

For the blood supplementation requirement of the game object on the battlefield, a second medicine usage recommendation interface may further be provided on the graphical user interface, so as to increase the health value of the game object by using the target treatment medicine.

Figure 5:
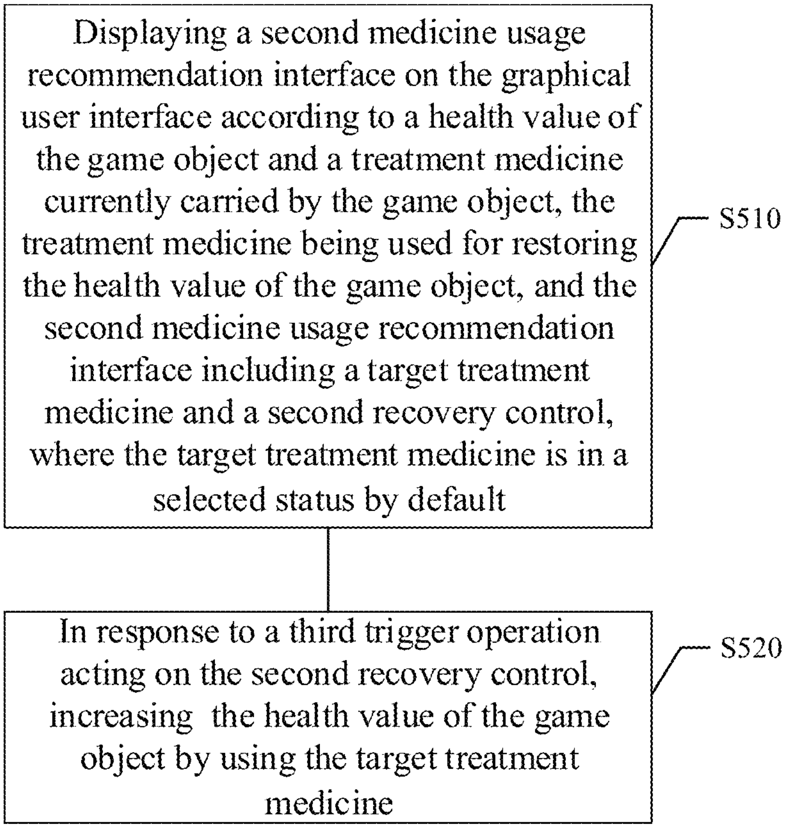
FIG. 5 schematically shows a schematic flowchart of a method for increasing a health value of a game object according to an embodiment of the present disclosure.

In some embodiments, FIG. 5 shows a schematic flowchart of a method for increasing the health value of a game object. As shown in FIG. 5, the method at least includes the following steps. In step S510, a second medicine usage recommendation interface is displayed on the graphical user interface according to the health value of the game object and the treatment medicine currently carried by the game object, the treatment medicine is used for restoring the health value of the game object, and the second medicine usage recommendation interface includes a target treatment medicine and a second recovery control, where the target treatment medicine is in a selected status by default.

In some embodiments, the target treatment medicine is determined according to a treatment medicine recommendation rule.

The treatment medicine recommendation rule is used to recommend a suitable target treatment medicine according to the health value of the game object in different cases.

Figure 6:
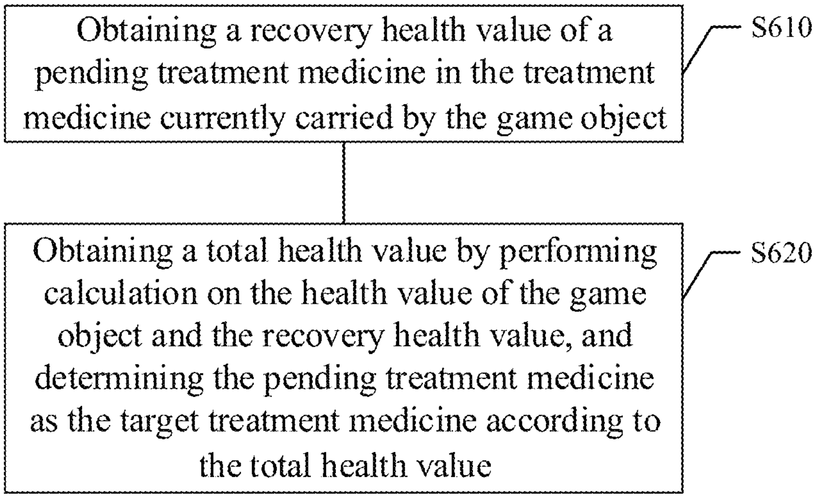
FIG. 6 schematically shows a schematic flowchart of a method for determining a target treatment medicine according to an embodiment of the present disclosure.

In some embodiments, FIG. 6 shows a schematic flowchart of a method for determining a target treatment medicine. As shown in FIG. 6, the method at least includes the following steps. In step S610, a recovery health value of a pending treatment medicine in the treatment medicine currently carried by the game object is obtained.

Generally, there are three types of treatment medicines currently carried by the game object, which are respectively a small medicine kit, a large medicine kit and a first-aid kit, and among the prices of the small medicine kit, the large medicine kit and the first-aid kit, the price of the small medicine kit is generally the lowest, and the price of the large medicine kit is in the middle and the price of the first-aid kit is most expensive. Correspondingly, the health value to be restored by the small medicine kit is the minimum, the health value to be restored by the large medicine kit is in the middle, and the health value to be restored by the first-aid package is the most.

Therefore, when the player carries one or more treatment medicines, the carried treatment medicine may be determined as a pending treatment medicine, and a recovery health value corresponding to the pending treatment medicine can be obtained.

In step S620, a total health value is obtained by performing calculation on the health value and the recovery health value of the game object, and the pending treatment medicine is determined as the target treatment medicine according to the total health value.

After the current health value of the game object and the recovery health value corresponding to the pending treatment medicine are obtained, the total health value of the game object under the condition of using the corresponding pending treatment medicine can be obtained by performing a sum calculation on the health value and the recovery health value.

Furthermore, the target treatment medicine is determined according to the total health value of the game object.

Figure 7:
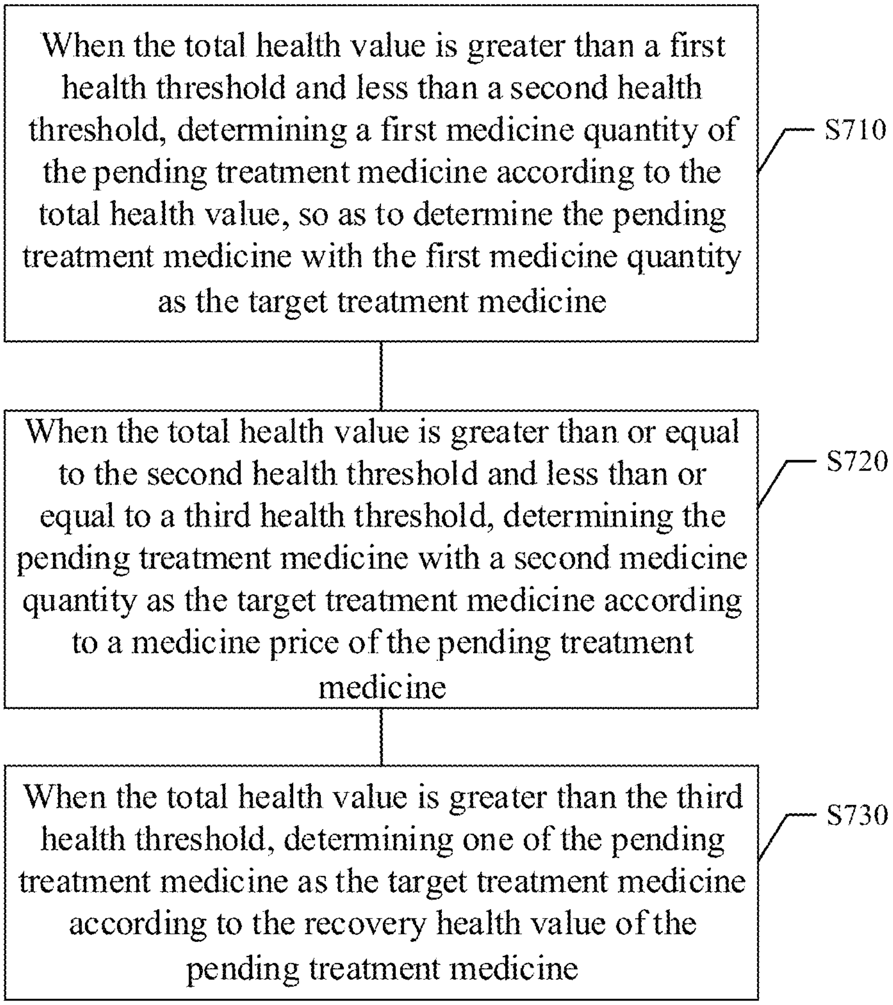
FIG. 7 schematically shows a schematic flowchart of a method for further determining a target treatment medicine according to an embodiment of the present disclosure.

In some embodiments, FIG. 7 shows a schematic flowchart of a method for further determining a target treatment medicine. As shown in FIG. 7, the method at least includes the following steps. In step S710, when the total health value is greater than a first health threshold and less than a second health threshold, a first medicine quantity of the pending treatment medicine is determined according to the total health value, so as to determine the pending treatment medicine with the first medicine quantity as the target treatment medicine.

Due to the fact that when the health value of the game object can be restored to 80% or up, it will not affect the normal game of the player basically, so that the first health threshold can be set to 0, and the second health threshold is set to 80%.

When the total health value is greater than 0 and less than 80%, the pending treatment medicine with the first medicine quantity can be determined as the target treatment medicine according to the total health value.

In some embodiments, under the condition that the health value is less than the second health threshold, the first medicine quantity of the pending treatment medicine when the total health value is maximum is determined.

When the first medicine quantity of the pending treatment medicine is determined, the medicine quantities of various types of pending treatment medicines under the condition that the total health value can be maximum can be calculated, taking that the total health value is less than the second health threshold as a condition, so as to serve as the first medicine quantity. For example, the first medicine quantity may include the medicine quantities of the small medicine kit, the large medicine kit and the first-aid kit, being n_1, n_2, and n_3, respectively.

After the first medicine quantity is determined, the pending treatment medicine with the first medicine quantity can be determined as the target treatment medicine.

In step S720, when the total health value is greater than or equal to the second health threshold and less than or equal to the third health threshold, the pending treatment medicine with the second medicine quantity is determined as the target treatment medicine according to the medicine price of the pending treatment medicine.

In order to provide a certain tolerance when determining the target treatment medicine, the third health threshold may be set to 105%.

When the total health value is greater than or equal to 80% and less than 105%, the normal game operation of the player has been supported sufficiently. In this case, the pending treatment medicine with the second medicine quantity of the highest cost performance may be determined as the target treatment medicine.

Figure 8:
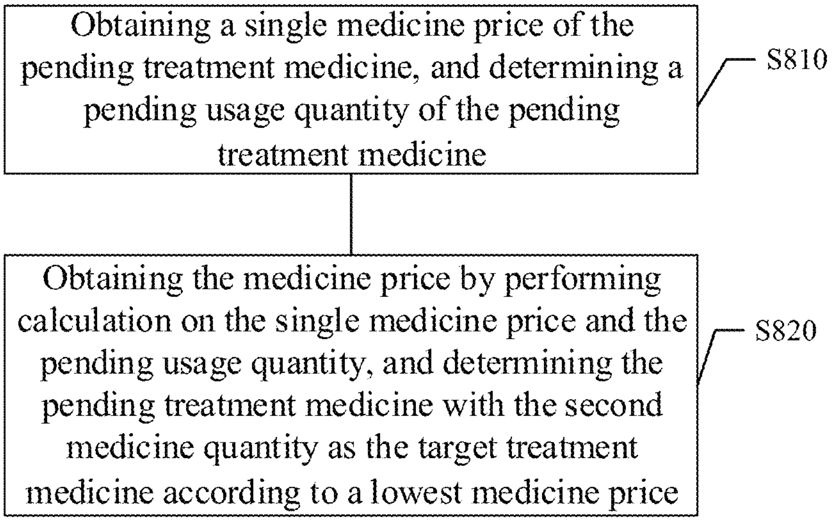
FIG. 8 schematically shows a schematic flowchart of a method for determining a pending treatment medicine with a second medicine quantity as a target treatment medicine according to an embodiment of the present disclosure.

In some embodiments, FIG. 8 shows a schematic flowchart of a method for determining a pending treatment medicine with a second medicine quantity as a target treatment medicine. As shown in FIG. 8, the method at least includes the following step. In step S810, a single medicine price of the pending treatment medicine is obtained and a pending usage quantity of the pending treatment medicine is determined.

The single medicine prices of the small medicine kit, the large medicine kit and the first-aid kit are respectively P_1, P_2 and P_3, and the pending usage quantities of the small medicine kit, the large medicine kit and the first-aid kit can be determined to be n_1, n_2 and n_3, respectively.

In step S820, the medicine price can be obtained by performing calculation on the single medicine price and the pending usage quantity, and the pending treatment medicine with the second medicine quantity is determined as the target treatment medicine according to the lowest medicine price.

After determining the single medicine price and the pending usage quantity, the corresponding medicine price p can be obtained by performing a calculation of p_1*n_1+p_2*n_2+p_3*n_3.

Furthermore, the pending usage quantities of the small medicine kit, the large medicine kit and the first-aid kit when the medicine price p is the minimum value, being n_1, n_2 and n_3 respectively, are determined as the second medicine quantity. In addition, the pending treatment medicine with the second medicine quantity is determined as the target treatment medicine.

In the present embodiment, the target treatment medicine is determined according to the cost performance principle, recommending the most economical treatment medicine usage scheme suitable for the player, and saving the cost of using the target treatment medicine for the player.

In step S730, when the total health value is greater than the third health threshold, a pending treatment medicine is determined as the target treatment medicine according to the recovery health value of the pending treatment medicine.

When the total health value is greater than 105%, the pending treatment medicine with the smallest recovery health value can be determined as the target treatment medicine according to the recovery health value of the pending treatment medicine.

In the present embodiment, the corresponding target treatment medicine can be determined according to different situations of the total health value, so that the player can use the target treatment medicine with the maximum cost performance, avoiding waste of the target treatment medicine, and avoiding the situation of inefficient battlefield decision-making due to the player thinking too long caused by selecting the target treatment medicine based on the cost performance principle.

In order to facilitate the player to grasp the total health value that can be restored and the total health value overflow condition, corresponding prompt information may also be displayed.

Figure 9:
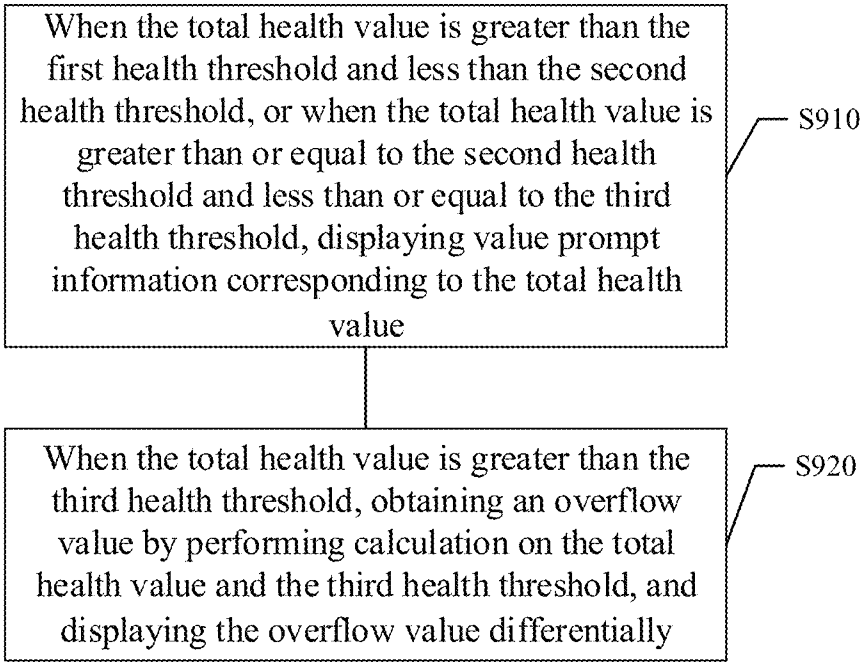
FIG. 9 schematically shows a schematic flowchart of a method for displaying prompt information in different situations according to an embodiment of the present disclosure.

In some embodiments, FIG. 9 shows a schematic flowchart of a method for displaying prompt information under different situations. As shown in FIG. 9, the method at least includes the following steps. In step S910, when the total health value is greater than a first health threshold and less than a second health threshold, or when the total health value is greater than or equal to a second health threshold and less than or equal to a third health threshold, value prompt information is displayed corresponding to the total health value.

When the total health value is greater than 0 and less than 80%, or the total health value is greater than or equal to 80% and less than 105%, the value prompt information corresponding to the total health value that can be restored to is displayed. The value prompt information may be text information, such as "Health can be restored to 70%", or the like, or may be in the form of an icon marked with a total health value, which is not specifically limited in the present embodiment.

In step S920, when the total health value is greater than the third health threshold, an overflow value is obtained by performing calculation on the total health value and the third health threshold, and the overflow value is displayed differentially.

When the total health value is greater than 105%, the overflow value can be obtained by performing a difference calculation on the total health value and 105%, and the overflow value can be differentially displayed. For example, the overflow value is displayed in red, in order to prompt the overflow situation to the player.

In the present embodiment, different prompt information can be displayed for the total health value under different situations, so that the player can grasp the usage condition of the target treatment medicine, reducing the player's thinking process of self-calculation, and bringing more fighting time for the player.

In step S520, in response to a third trigger operation acting on the second recovery control, the health value of the game object is increased by using the target treatment medicine.

Since the target treatment medicine is in the selected status, the player may use the target treatment medicine through a third trigger operation acting on the second recovery control to increase the health value of the game object.

Among them, the third trigger operation may be a click operation, a long press operation, or a slide operation, etc., which is not specifically limited in the present embodiment.

It should be noted that the second recovery control may be the same control as the first recovery control, or may be a control completely different from the first recovery control, which is not specifically limited in the present embodiment.

In the present embodiment, the manner of restoring the health value of the game object is provided to the player through a second medicine usage recommendation interface. Even if the restored health value overflows, the possibility of autonomous usage is also provided for the player, optimizing the game experience of the player.

In addition to the first medicine usage recommendation interface and the second medicine usage recommendation interface, a third medicine usage recommendation interface can be also displayed on the graphical user interface, facilitating the player to adjust the status information of the game object and increase the health value of the game object simultaneously.

Figure 10:
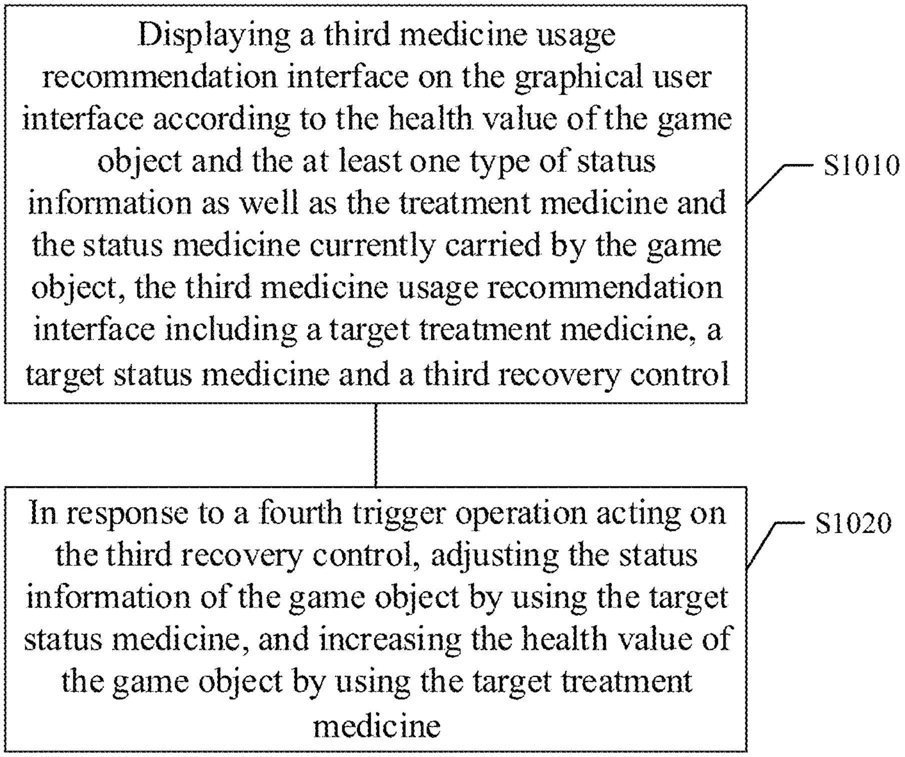
FIG. 10 schematically shows a schematic flowchart of a method for simultaneously adjusting status information and a health value of a game object according to an embodiment of the present disclosure.

In some embodiments, FIG. 10 shows a schematic flowchart of a method for simultaneously adjusting status information and a health value of a game object. As shown in FIG. 10, the method at least includes the following step. In step S1010, a third medicine usage recommendation interface is displayed on the graphical user interface according to the health value of the game object and at least one type of status information as well as the treatment medicine currently carried by the game object and the status medicine. The third medicine usage recommendation interface includes a target treatment medicine, a target status medicine, and a third recovery control.

The status information may be information representing the buff status of the game object, or may be information representing the debuff status of the game object, or may be other status information, which is not specifically limited in the present embodiment.

The status medicine currently carried by the game object may be a medicine for removing the debuff status of the game object, or may be a medicine for adding the buff status of the game object, or may be a medicine for restoring or adjusting other statuses, which is not specifically limited in the present embodiment.

Moreover, the target treatment medicine may also be determined according to the status medicine recommendation rule, the determination manner is the same as that of FIG. 3, and details are not described here again.

A treatment medicine is a medicine for restoring the health value of the game object. Moreover, the treatment medicine recommendation rule for determining the target treatment medicine is the same as that shown in FIG. 6, and details are not described here again.

In addition, a third recovery control may also be displayed in the third medicine usage recommended page. The third recovery control is used for the player to simultaneously control the usage of the target status medicine and the target treatment medicine.

In step S1020, in response to a fourth trigger operation acting on the third recovery control, the status information of the game object is adjusted by using the target status medicine, and the health value of the game object is increased by using the target treatment medicine.

After determining the target treatment medicine and the target status medicine, the player may simultaneously adjust the status information of the game object and the health value of the game object through the fourth trigger operation.

Among them, the fourth trigger operation may be a click operation, a long press operation, or a slide operation, etc., which is not specifically limited in the present embodiment.

In the present embodiment, a manner of restoring the health value of the game object and adjusting the status information simultaneously is provided to the player through a third medicine usage recommendation interface, simplifying the player's operation under the condition that the player has two requirements at the same time, reducing the player's operation time, and improving the battlefield decision and control efficiency.

In the case that a first medicine usage recommendation interface, a second medicine usage recommendation interface and a third medicine usage recommendation interface are provided on the graphical user interface, in order to facilitate the user to select and switch, the corresponding medicine usage recommendation interface can be displayed through a selection operation acting on a selection list.

Figure 11:
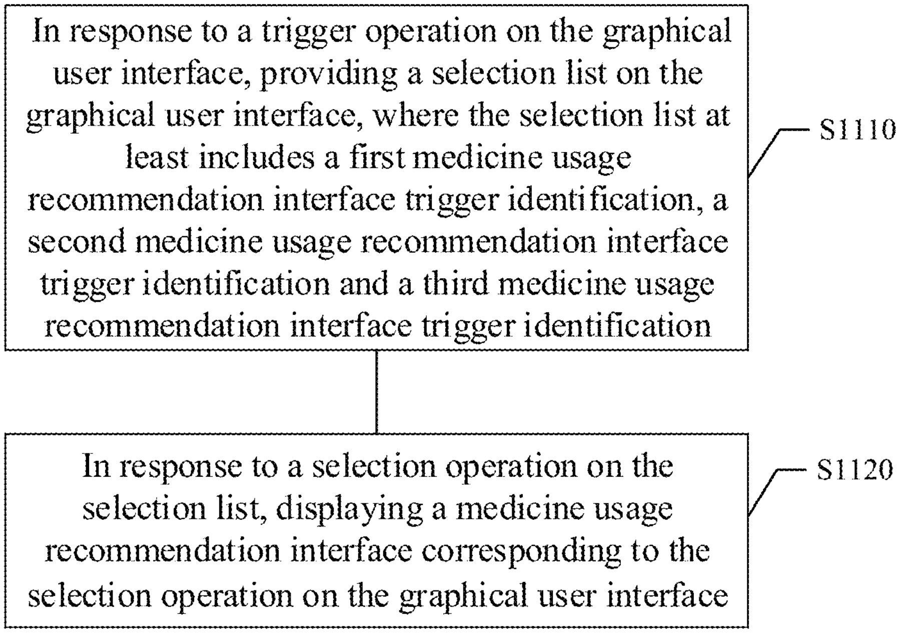
FIG. 11 schematically shows a schematic flowchart of a method for displaying a medicine usage recommendation interface corresponding to a selection operation according to an embodiment of the present disclosure.

In some embodiments, FIG. 11 shows a schematic flowchart of a method for displaying a medicine usage recommendation interface corresponding to a selection operation. As shown in FIG. 11, the method at least includes the following steps. In step S1110, in response to a trigger operation of the graphical user interface, a selection list is provided on the graphical user interface, where the selection list at least includes a first medicine usage recommendation interface trigger identification, a second medicine usage recommendation interface trigger identification and a third medicine usage recommendation interface trigger identification.

The selection list may be triggered and displayed through the trigger operation of the user. Moreover, a first medicine usage recommendation interface trigger identification, a second medicine usage recommendation interface trigger identification, and a third medicine usage recommendation interface trigger identification are displayed in the selection list.

For example, the first medicine usage recommendation interface trigger identification may be the PLAN1, the second medicine usage recommendation interface trigger identification may be the PLAN2, and the third medicine usage recommendation interface trigger identification may be the PLAN3. In addition, they may also be other corresponding trigger identifications, which are not specifically limited in the present embodiment.

In step S1120, in response to a selection operation on the selection list, a medicine usage recommendation interface corresponding to the selection operation is displayed on the graphical user interface.

In the case of displaying a selection list, the player may act a selection operation to determine the trigger identification of the medicine usage recommendation interface to be displayed, so as to display the medicine usage recommendation interface corresponding to the selection operation.

Among them, the selection operation may be in the form of a click operation, a long press operation, a slide operation, etc., which is not specifically limited in the present embodiment.

In the present embodiment, a manner of displaying a corresponding medicine usage recommendation interface is provided, and a solution is provided for the demand of the player to switch or select the medicine usage recommendation interface in the game process, so as to satisfy the display requirements of the player under different game scenes.

The method for controlling a game object in the embodiments of the present disclosure is described in detail below in combination with an application scenario.

Figure 12:
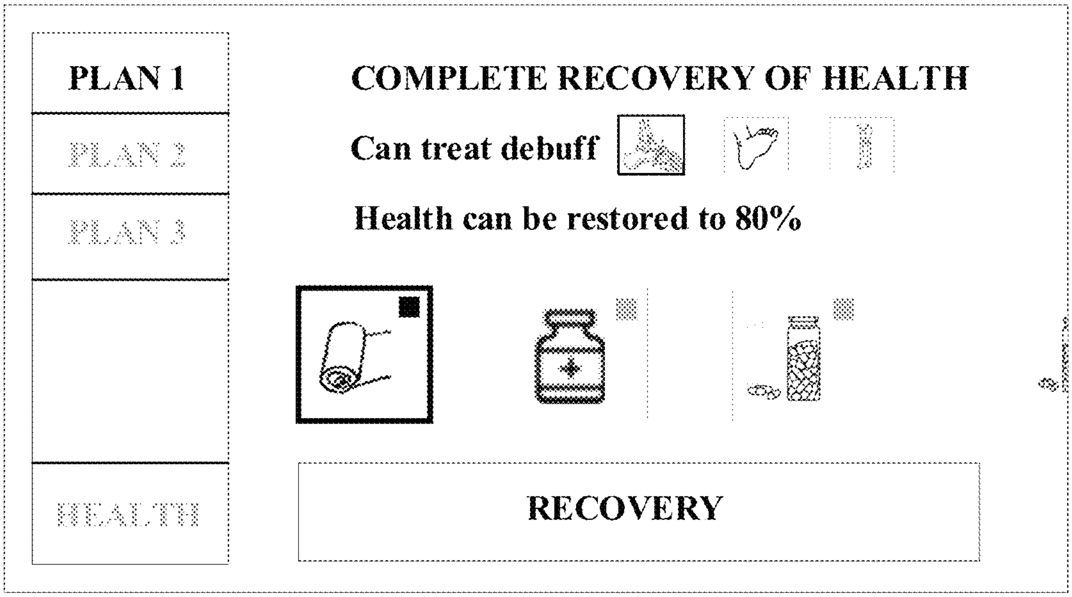
FIG. 12 schematically shows a schematic interface diagram for providing a display list under an application scenario according to an embodiment of the present disclosure.

FIG. 12 shows a schematic interface diagram for providing a selection list under an application scenario. As shown in FIG. 12, the selection list may be triggered and displayed through a trigger operation of a user; and, a first medicine usage recommendation interface trigger identification, a second medicine usage recommendation interface trigger identification, and a third medicine usage recommendation interface trigger identification are displayed in the selection list.

Among them, the first medicine usage recommendation interface trigger identification may be PLAN1, the second medicine usage recommendation interface trigger identification may be PLAN2, and the third medicine usage recommendation interface trigger identification may be PLAN3. In addition, they may be other corresponding trigger identifications, which are not specifically limited in the present embodiment.

When the player acts on the first medicine usage recommendation interface trigger identification PLAN1 through a selection operation, the first medicine usage recommendation interface corresponding to the selection operation may be displayed.

Figure 13:
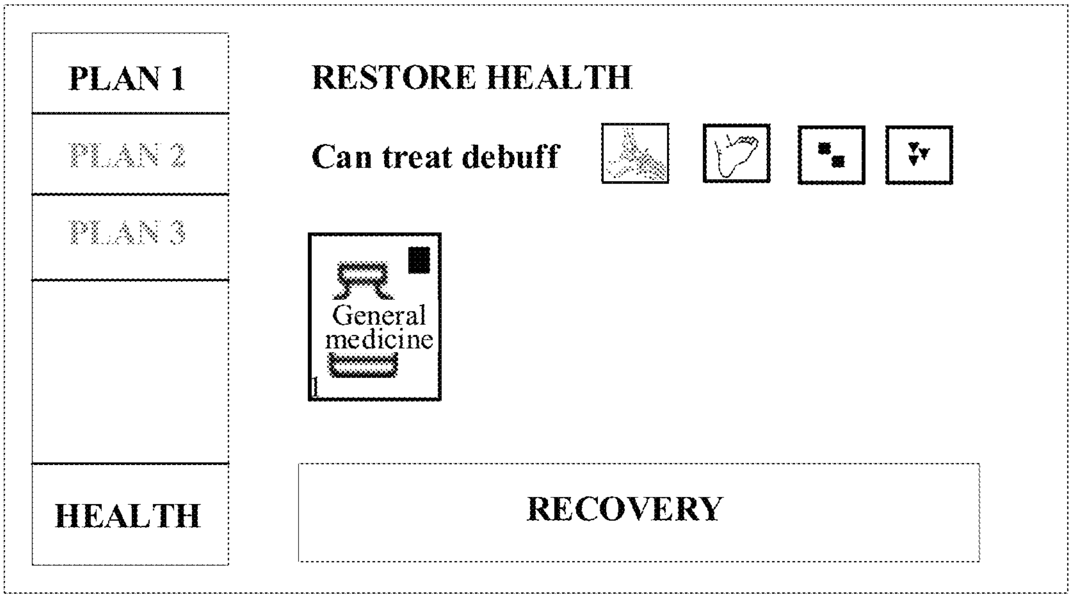
FIG. 13 schematically shows a schematic interface diagram for a first situation under an application scenario according to an embodiment of the present disclosure.

FIG. 13 shows a schematic interface diagram for a first situation under an application scenario. As shown in FIG. 13, there is no special status medicine corresponding to the status information in the status medicine currently carried by the game object, the general status medicine is determined as the target status medicine, and the target status medicine is selected by default. In addition, the target status medicine may be displayed correspondingly with the information of "general medicine", so as to facilitate the player to differentiate.

Since the general status medicine can adjust all status information of the game object, when the target status medicine is a general status medicine, all status icons can be highlighted.

Figure 14:
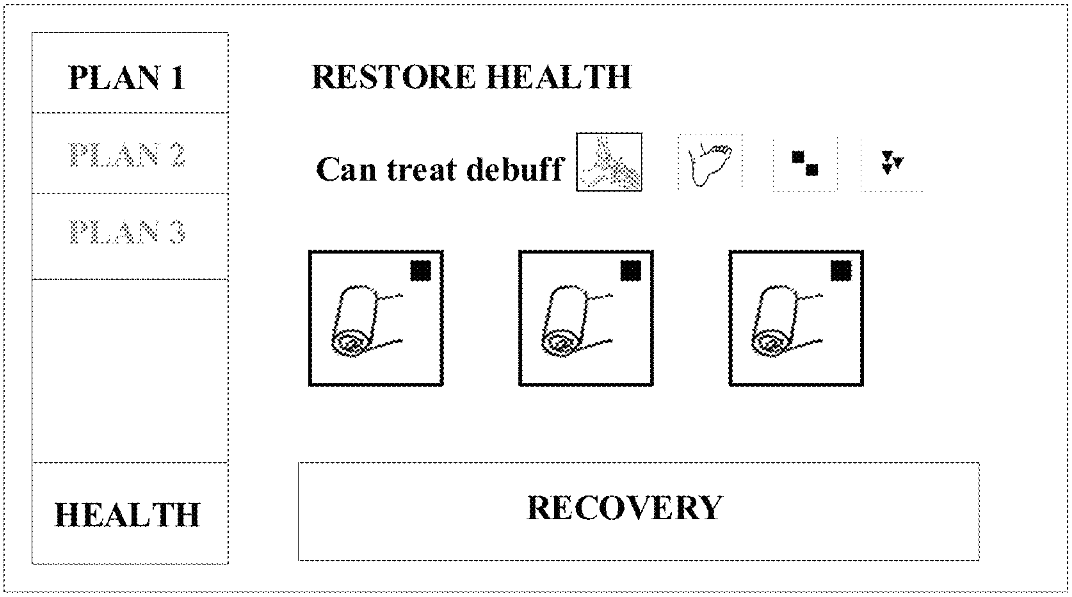
FIG. 14 schematically shows a schematic interface diagram for a second situation under an application scenario according to an embodiment of the present disclosure.

FIG. 14 shows a schematic interface diagram for a second situation under an application scenario. As shown in FIG. 14, there is a special status medicine corresponding to the status information in the status medicine currently carried by the game object, the special status medicine is determined as the target status medicine, and the target status medicine is selected by default.

Since the special status medicine can only adjust one type of status information of the game object, when the target status medicine is a special status medicine, all status icons can be displayed, and only the status icon of the status information that can be adjusted by the target status medicine is highlighted.

Figure 15:
FIG. 15 schematically shows a schematic interface diagram for a third scenario under an application scenario according to an embodiment of the present disclosure.

FIG. 15 shows a schematic interface diagram for a third situation under an application scenario. As shown in FIG. 15, when there is no general status medicine and one or more special status medicines in the status medicine currently carried by the game object, and there is a special status medicine corresponding to the status information, the non-existing special status medicine may be displayed in gray. In addition, a quantity of 0 may also be displayed on the icon of the special status medicine, and placed at the end of the status medicine list.

In addition, it can be a default that the currently owned special status medicine and all status icons are selected, the status icon corresponding to the special status medicine is highlighted, and the status icon not corresponding to the special status medicine is displayed in gray.

Figure 16:
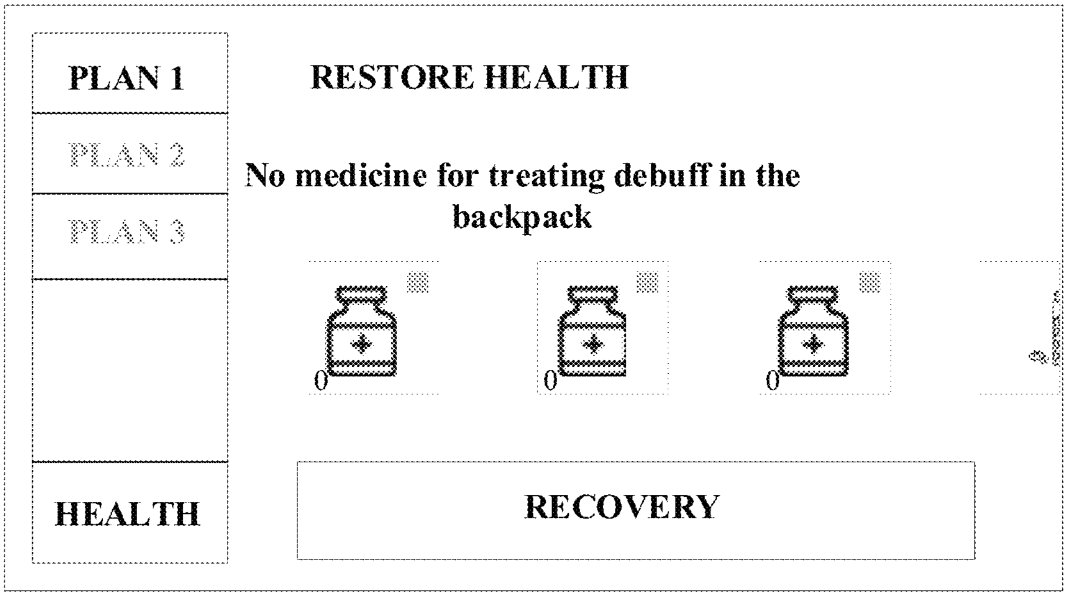
FIG. 16 schematically shows a schematic interface diagram for a fourth situation under an application scenario according to an embodiment of the present disclosure.

FIG. 16 shows a schematic interface diagram for a fourth situation under an application scenario. As shown in FIG. 16, the game object currently carries no any special status medicine or general status medicine, and prompt information of words such as "No medicine for treating debuff in the backpack" can be displayed on the first medicine usage recommendation interface, so as to facilitate the player to grasp the current status medicine owning condition.

Figure 17:
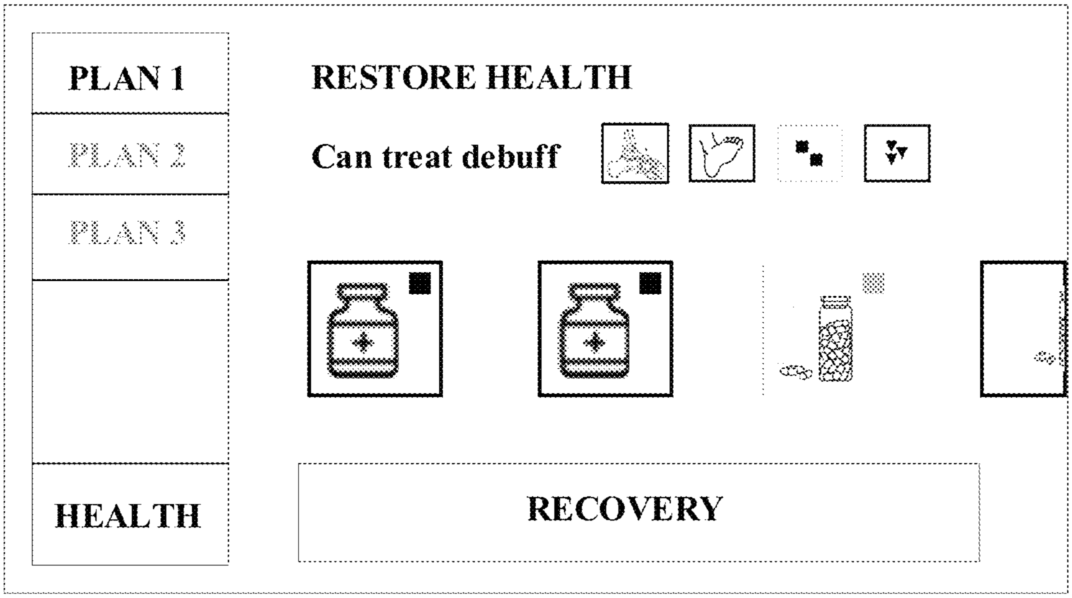
FIG. 17 schematically shows a schematic interface diagram for canceling a selected status of a target status medicine under an application scenario according to an embodiment of the present disclosure.

FIG. 17 shows a schematic interface diagram for canceling a selected status of a target status medicine under an application scenario. As shown in FIG. 17, after the player performs a second trigger operation, highlight display of the status icon corresponding to the target status medicine can be canceled, and simultaneously, the target status medicine can be adjusted into an unselected status.

Figure 18:
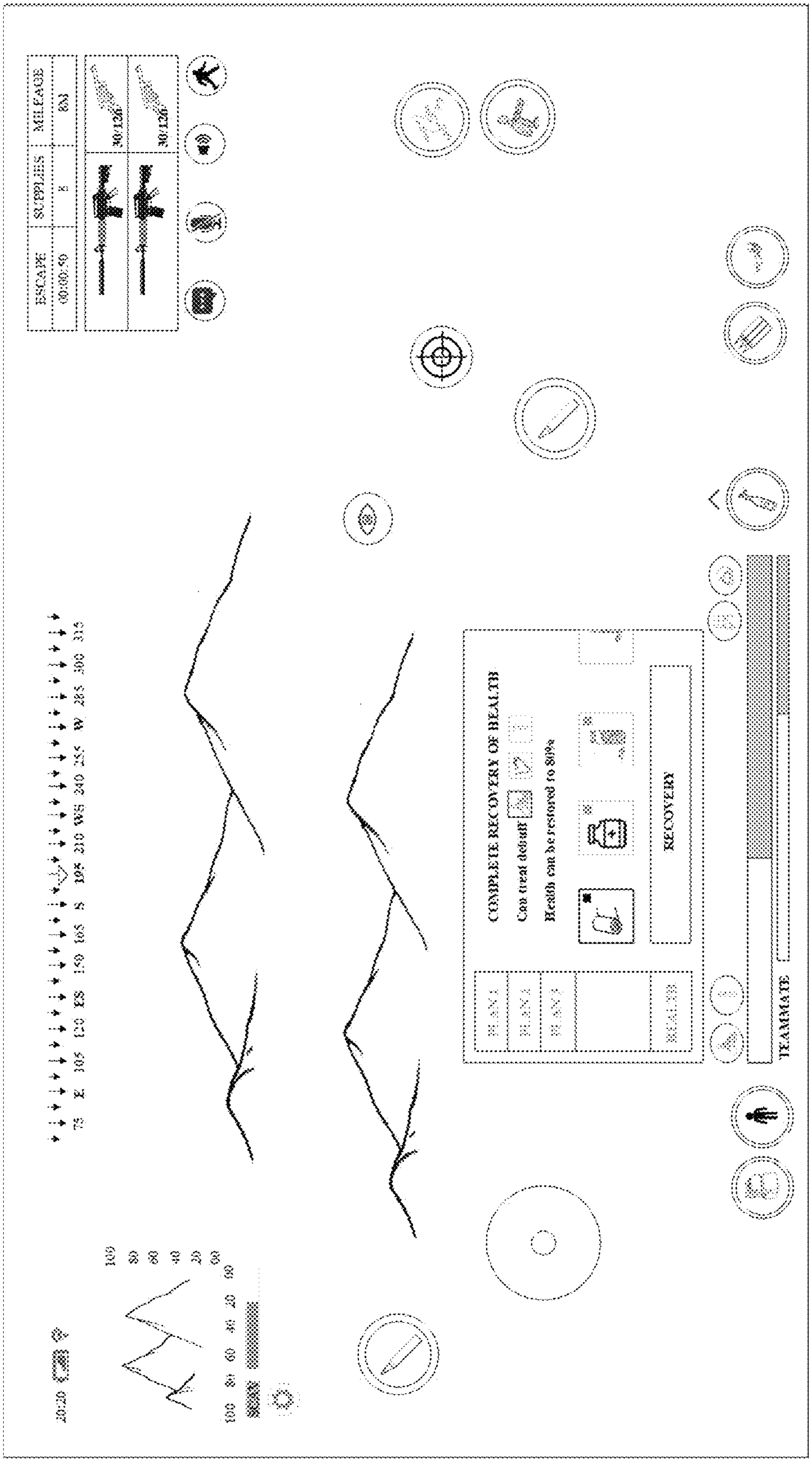
FIG. 18 schematically shows a schematic operation interface diagram for canceling selection of a target status medicine under an application scenario according to an embodiment of the present disclosure.

FIG. 18 shows a schematic operation interface diagram for canceling selection of a target status medicine under an application scenario. As shown in FIG. 18, when the player acts a second trigger operation on the second special status medicine, highlight display of the status icon corresponding to the second special status medicine can be canceled, and simultaneously, the second special status medicine can be adjusted into an unselected status.

Figure 19:
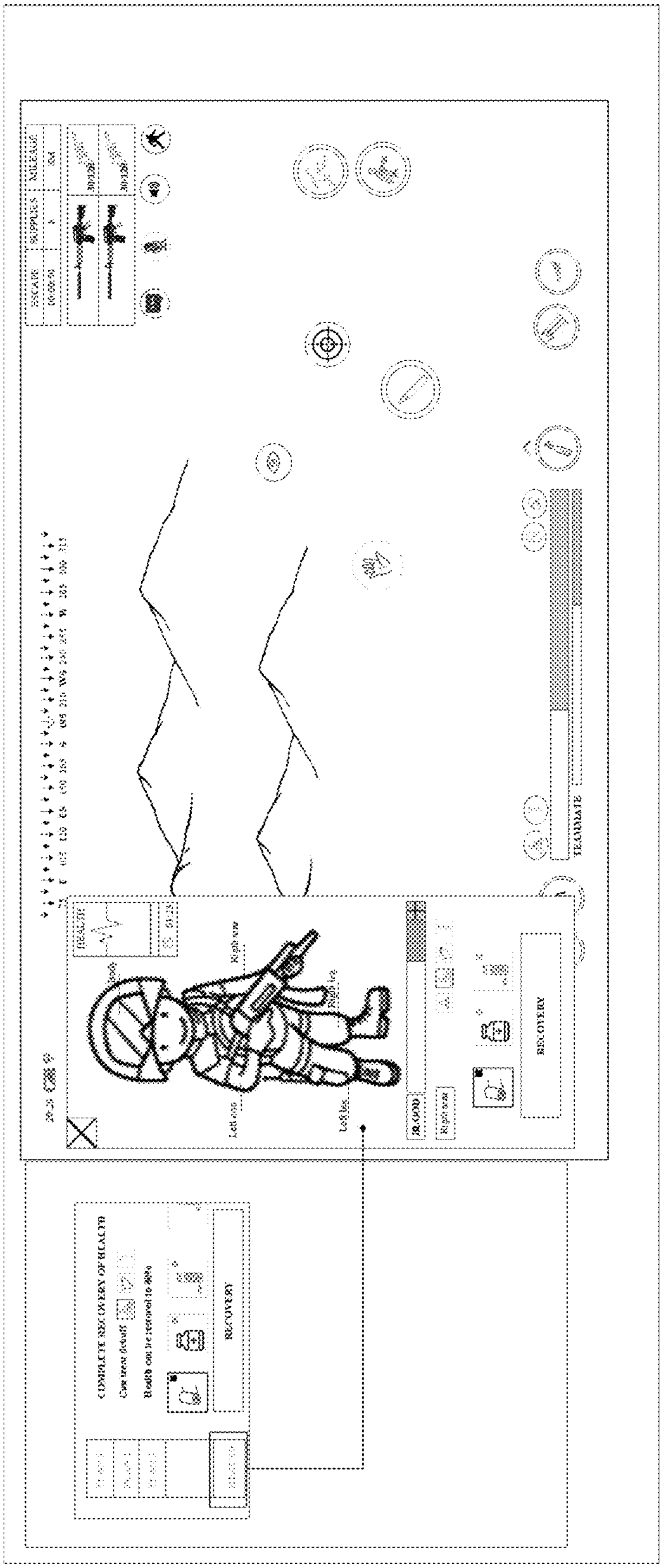
FIG. 19 schematically shows a schematic interface diagram for displaying a detail treatment interface under an application scenario according to an embodiment of the present disclosure.

FIG. 19 shows a schematic interface diagram for displaying a detail treatment interface under an application scenario. As shown in FIG. 19, an identification, such as "Health", for entering a detail treatment interface of each medicine usage recommendation interface may also be provided in the selection list. The player may enter the detail treatment interface corresponding to the current medicine usage recommendation interface through a trigger operation acting on the identification, so as to more intuitively display the correspondence relationship between the status medicine and the status icon for the player.

When the player acts on the second medicine usage recommendation interface trigger identification PLAN2 through a selection operation, the second medicine usage recommendation interface corresponding to the selection operation may be displayed.

Figure 20:
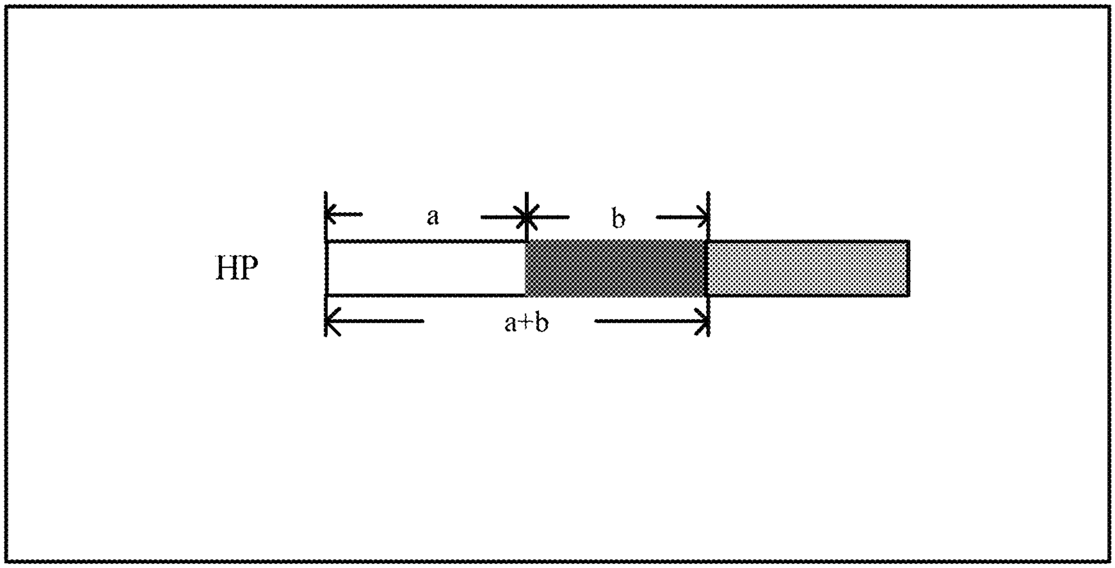
FIG. 20 schematically shows a schematic interface diagram for determining a total health value under an application scenario according to an embodiment of the present disclosure.

FIG. 20 shows a schematic interface diagram for determining a total health value under an application scenario. As shown in FIG. 20, the total health value that can be restored to may be 100%, the current health value of the game object may be a, and a<100%; the recovery health value of the pending treatment medicine is b, and b depends on the medicine quantity n_1, n_2 and n_3 of the small medicine kit, the large medicine kit and the first-aid kit. Therefore, the total health value a+b can be obtained by performing calculation on the health value of the game object and the recovery health value.

Figure 21:
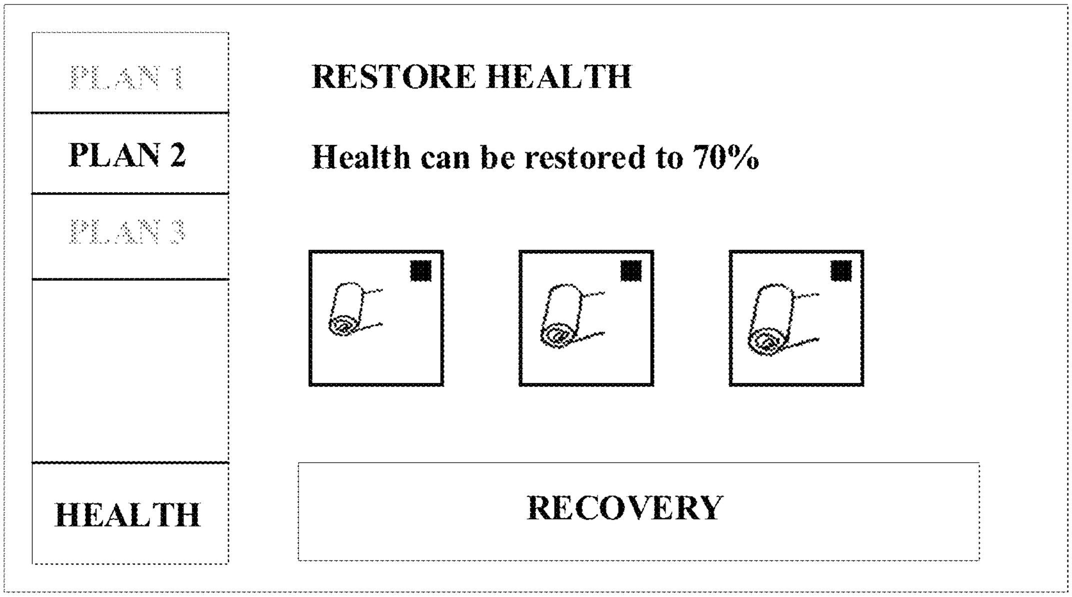
FIG. 21 schematically shows a schematic interface diagram for determining a target treatment medicine under an application scenario according to an embodiment of the present disclosure.

FIG. 21 shows a schematic interface diagram for determining a target treatment medicine under an application scenario. As shown in FIG. 21, when the total health value is greater than 0 and less than 80%, the pending treatment medicine with the first medicine quantity can be determined as the target treatment medicine according to the total health value.

When the first medicine quantity of the pending treatment medicine is determined, the medicine quantities of various types of pending treatment medicines under the condition that the total health value can be maximum can be calculated, taking that the total health value is less than the second health threshold as a condition, so as to serve as the first medicine quantity. For example, the first medicine quantity may include the medicine quantities of the small medicine kit, the large medicine kit and the first-aid kit, being n_1, n_2, and n_3, respectively.

After the first medicine quantity is determined, the pending treatment medicine with the first medicine quantity can be determined as the target treatment medicine.

Furthermore, the pending treatment medicine with the first medicine quantity is selected as the recommendation scheme by default, and value prompt information of the total health value after using the target treatment medicine is displayed simultaneously. The value prompt information is "Health can be restored to 70%".

Figure 22:
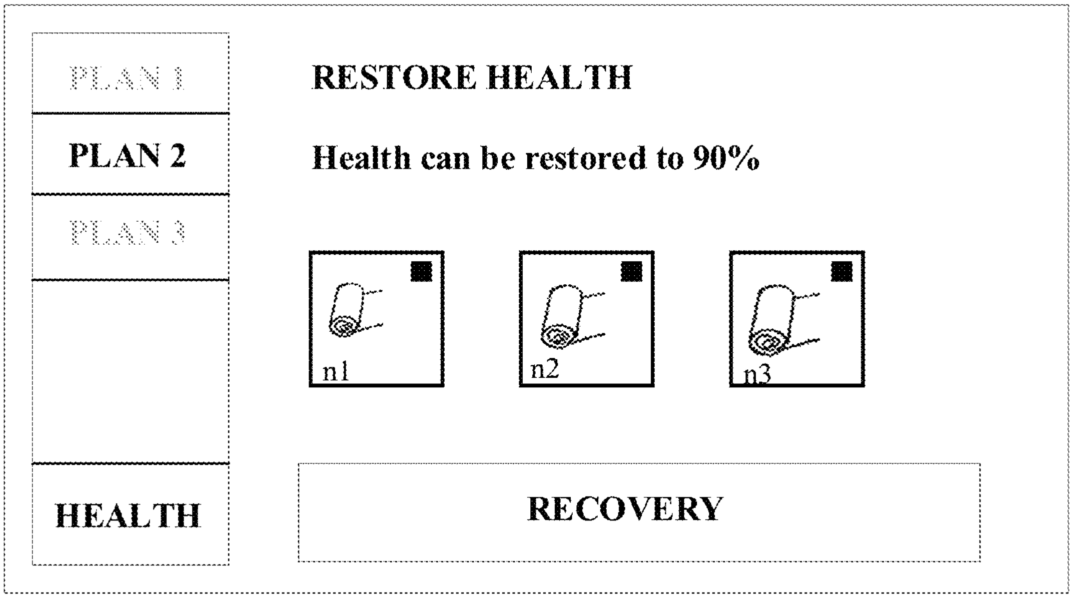
FIG. 22 schematically shows another schematic interface diagram for determining a target treatment medicine under an application scenario according to an embodiment of the present disclosure.

FIG. 22 shows another schematic interface diagram for determining a target treatment medicine under an application scenario. As shown in FIG. 22, when the total health value is greater than or equal to 80% and less than 105%, it has been sufficient to support the normal game operation of the player. In this case, the pending treatment medicine with the second medicine quantity of the highest cost performance may be determined as the target treatment medicine.

The single medicine prices of the small medicine kit, the large medicine kit and the first-aid kit are respectively p_1, p_2 and p_3, and the pending usage quantities of the small medicine kit, the large medicine kit and the first-aid kit can be determined to be n_1, n_2 and n_3, respectively.

After determining the single medicine price and the pending usage quantity, the corresponding medicine price p can be obtained by performing a calculation of p_1*n_1+p_2*n_2+p_3*n_3.

Furthermore, the pending usage quantities of the small medicine kit, the large medicine kit and the first-aid kit when the medicine price p is the minimum value, being n_1, n_2 and n_3 respectively, are determined as the second medicine quantity. In addition, the pending treatment medicine with the second medicine quantity is determined as the target treatment medicine.

Furthermore, the pending treatment medicine with the second medicine quantity is selected as the recommendation scheme by default, and value prompt information of the total health value after using the target treatment medicine is displayed simultaneously. The value prompt information is "Health can be restored to 70%".

Figure 23:
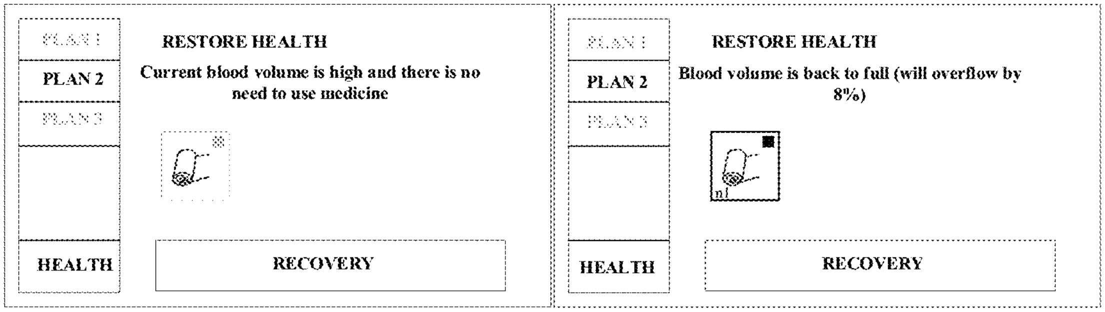
FIG. 23 schematically shows yet another schematic interface diagram for determining a target treatment medicine under an application scenario according to an embodiment of the present disclosure.

FIG. 23 shows yet another schematic interface diagram for determining a target treatment medicine under an application scenario. As shown in FIG. 23, when the total health value is greater than 105%, the pending treatment medicine with the smallest recovery health value can be determined as the target treatment medicine according to the recovery health value of the pending treatment medicine.

However, at this time, the target treatment medicine is not selected by default, but under the condition that the player performs an active selection, the overflow value is marked with an obvious color.

Figure 24:
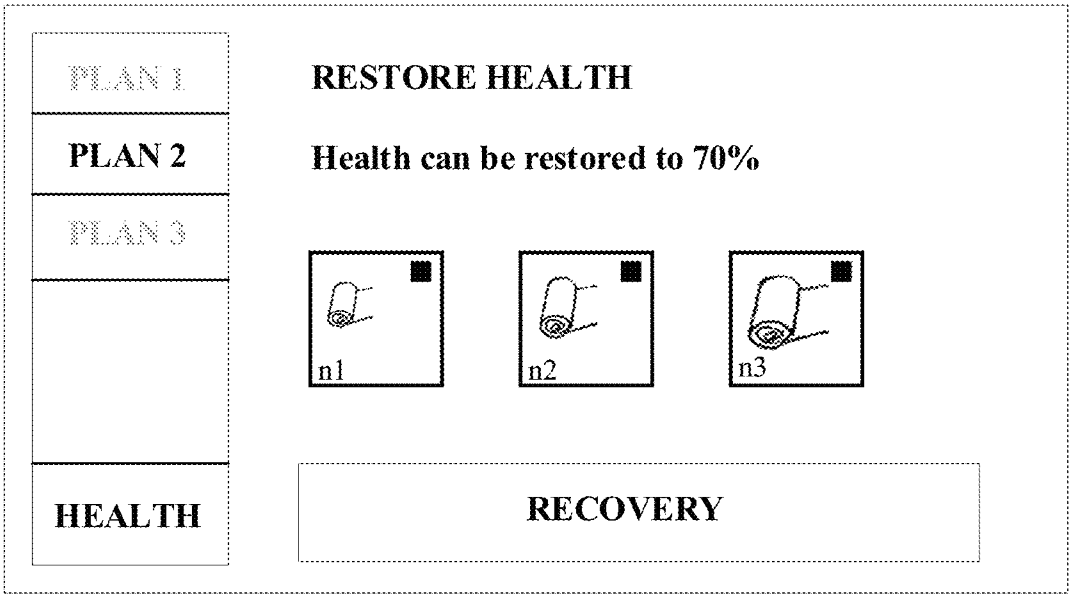
FIG. 24 schematically shows a schematic interface diagram for determining all treatment medicines as target treatment medicines under an application scenario according to an embodiment of the present disclosure.

FIG. 24 shows a schematic interface diagram for determining all treatment medicines as target treatment medicines under an application scenario. As shown in FIG. 24, when all treatment medicines currently carried by the game object are determined as pending treatment medicines, and the total health value is still greater than 0 and less than 80%, all treatment medicines can be selected by default, and value prompt information of the total health value that can be restored to after using all the treatment medicines is displayed simultaneously.

Figure 25:
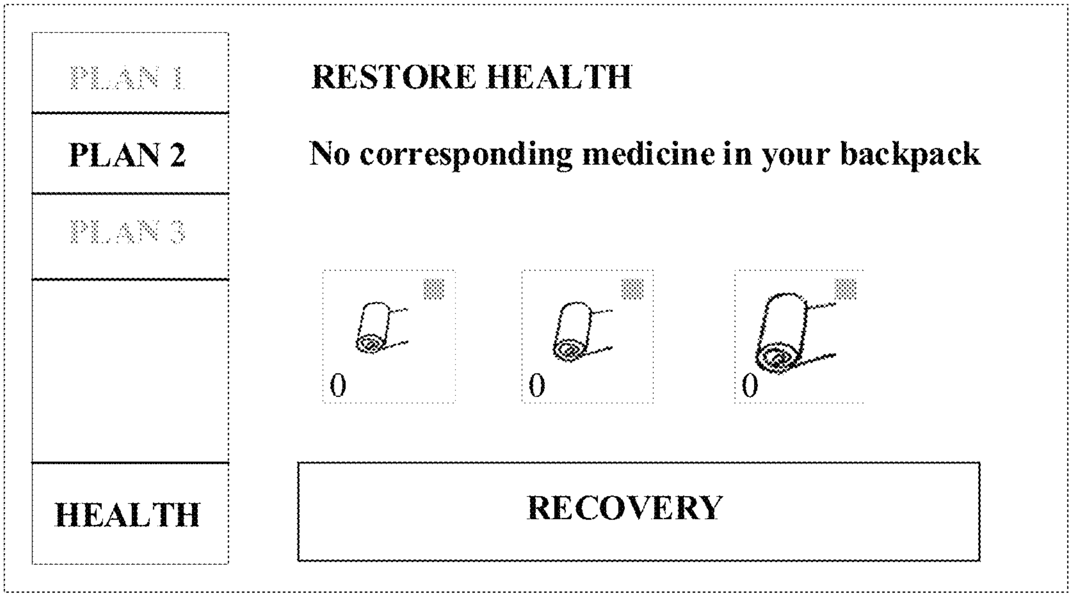
FIG. 25 schematically shows a schematic interface diagram that a target treatment medicine cannot be determined under an application scenario according to an embodiment of the present disclosure.

FIG. 25 shows a schematic interface diagram that a target treatment medicine cannot be determined under an application scenario. As shown in FIG. 25, when the game object currently carries no any treatment medicine, all treatment medicines capable of restoring the health value can be recommended to be displayed in the display list of the treatment medicine, and the treatment medicines can be displayed in gray. In addition, the quantity of the treatment medicines may be displayed as 0, and located at the end of the display list.

When the player acts on the third medicine usage recommendation interface trigger identification PLAN3 through a selection operation, the third medicine usage recommendation interface corresponding to the selection operation may be displayed.

Figure 26:
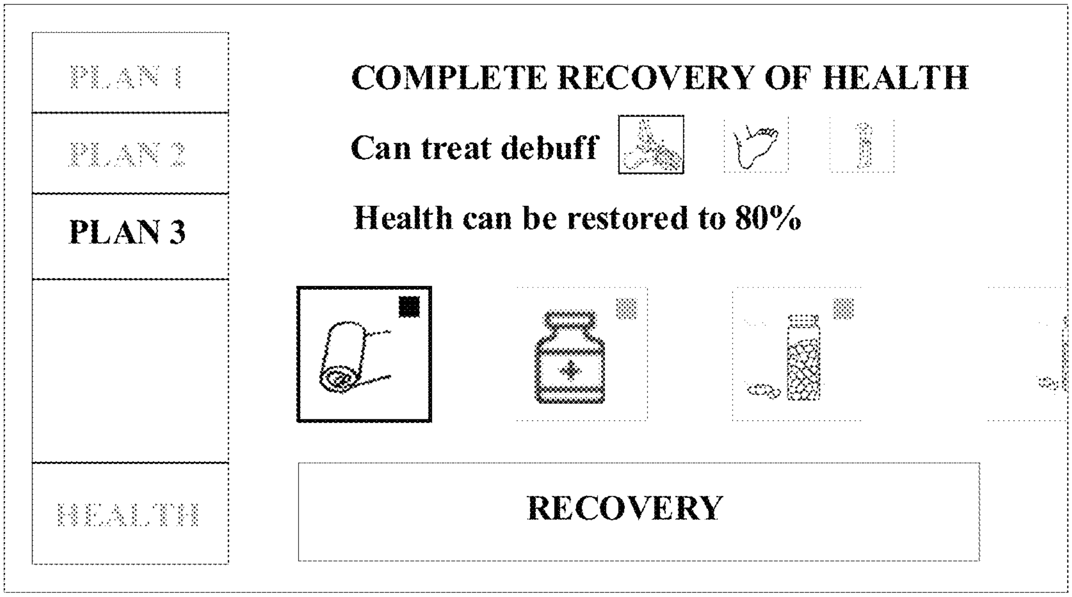
FIG. 26 schematically shows a schematic interface diagram of a third medicine usage recommendation interface under an application scenario according to an embodiment of the present disclosure.

FIG. 26 shows a schematic interface diagram of a third medicine usage recommendation interface under an application scenario. As shown in FIG. 26, the third medicine usage recommendation interface not only can display the status medicine on the first medicine usage recommendation interface, but also can display the treatment medicine on the second medicine usage recommendation interface, so as to provide support for the player under the condition that it is needed to adjust the status information of the game object and restore the health value of the game object.

In the method for controlling the game object under the application scenario, a first medicine usage recommendation interface is displayed on a graphical user interface, providing an adjustment entry of status information for a player, and improving the method for controlling a game object. Furthermore, status icons corresponding to the status information are displayed in the first medicine usage recommendation interface, and the target status medicine can be used by the player without considering the corresponding relationship between the status icon and the status information, avoiding the situation of inefficient battlefield decision-making due to the player thinking too long under an emergency battle condition, reducing the waste of the target status medicine caused by the player operating too fast, improving the automation and intelligence level of target status medicine usage, optimizing the player's experience significantly, and improving the returning rate of the player to a certain extent.

Figure 27:
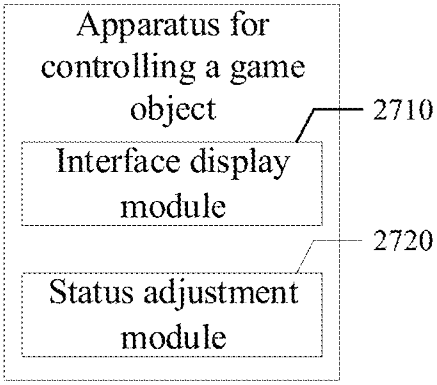
FIG. 27 schematically shows a schematic structural diagram of an apparatus for controlling a game object according to an embodiment of the present disclosure.

In addition, in an embodiment of the present disclosure, there is further provided an apparatus for controlling a game object. FIG. 27 shows a schematic structural diagram of an apparatus for controlling a game object. As shown in FIG. 27, the apparatus for controlling a game object 2700 may include an interface display module 2710 and a status adjustment module 2720.

The interface display module 2710 is configured to display a first medicine usage recommendation interface on a graphical user interface according to at least one type of status information of the game object and a status medicine currently carried by the game object, the status medicine is used for adjusting status information of the game object, and the first medicine usage recommendation interface includes a status icon corresponding to the status information, a target status medicine and a first recovery control, where a status icon corresponding to the target status medicine among the status icon is displayed differentially. The status adjustment module 2720 is configured to adjust status information of the game object by using the target status medicine in response to a first trigger operation acting on the first recovery control.

In an embodiment of the present disclosure, displaying a status icon corresponding to the target status medicine among the status icon differentially includes:

determining the target status medicine in the status medicine according to a status medicine recommendation rule;

displaying the status icon corresponding to the target status medicine differentially.

In an embodiment of the present disclosure, the status medicine includes a special status medicine and a general status medicine.

Determining the target status medicine in the status medicine according to a status medicine recommendation rule, includes:

when there is a special status medicine corresponding to the status information, determining the special status medicine as the target status medicine;

when there is no special status medicine corresponding to the status information, determining the general status medicine as the target status medicine.

In an embodiment of the present disclosure, displaying the status icon corresponding to the target status medicine differentially includes:

when the target status medicine is a special status medicine, displaying the status icon corresponding to the target status medicine differentially;

when the target status medicine is a general status medicine, displaying all status icons differentially.

In an embodiment of the present disclosure, the target status medicine is a selected status.

In an embodiment of the present disclosure, after displaying the status icon corresponding to the target status medicine among the status icon differentially, the method for controlling a game object further includes:

in response to a second trigger operation acting on the target status medicine, canceling differential display of the status icon corresponding to the target status medicine, and adjusting the target status medicine into an unselected status.

In an embodiment of the present disclosure, the method for controlling a game object further includes:

displaying a second medicine usage recommendation interface on the graphical user interface according to a health value of the game object and a treatment medicine currently carried by the game object, the treatment medicine being used for restoring the health value of the game object, and the second medicine usage recommendation interface including a target treatment medicine and a second recovery control, where the target treatment medicine is in a selected status by default;

in response to a third trigger operation acting on the second recovery control, increasing the health value of the game object by using the target treatment medicine.

In an embodiment of the present disclosure, the target treatment medicine is determined according to a treatment medicine recommendation rule.

In an embodiment of the present disclosure, determining the target treatment medicine according to a treatment medicine recommendation rule includes:

obtaining a recovery health value of a pending treatment medicine in the treatment medicine currently carried by the game object;

obtaining a total health value by performing calculation on the health value of the game object and the recovery health value, and determining the pending treatment medicine as the target treatment medicine according to the total health value.

In an embodiment of the present disclosure, determining the pending treatment medicine as the target treatment medicine according to the total health value includes:

when the total health value is greater than a first health threshold and less than a second health threshold, determining a first medicine quantity of the pending treatment medicine according to the total health value, so as to determine the pending treatment medicine with the first medicine quantity as the target treatment medicine;

when the total health value is greater than or equal to the second health threshold and less than or equal to a third health threshold, determining the pending treatment medicine with a second medicine quantity as the target treatment medicine according to a medicine price of the pending treatment medicine;

when the total health value is greater than the third health threshold, determining a pending treatment medicine as the target treatment medicine according to the recovery health value of the pending treatment medicine.

In an embodiment of the present disclosure, determining a first medicine quantity of the pending treatment medicine according to the total health value includes:

in the condition that the total health value is less than the second health threshold, determining the first medicine quantity of the pending treatment medicine when the total health value is maximum.

In an embodiment of the present disclosure, determining the pending treatment medicine with a second medicine quantity as the target treatment medicine according to a medicine price of the pending treatment medicine includes:

obtaining a single medicine price of the pending treatment medicine, and determining a pending usage quantity of the pending treatment medicine;

obtaining the medicine price by performing calculation on the single medicine price and the pending usage quantity, and determining the pending treatment medicine with the second medicine quantity as the target treatment medicine according to a lowest medicine price.

In an embodiment of the present disclosure, the method for controlling a game object further includes:

when the total health value is greater than the first health threshold and less than the second health threshold, or when the total health value is greater than or equal to the second health threshold and less than or equal to the third health threshold, displaying value prompt information corresponding to the total health value;

when the total health value is greater than the third health threshold, obtaining an overflow value by performing calculation on the total health value and the third health threshold, and displaying the overflow value differentially.

In an embodiment of the present disclosure, the method for controlling a game object further includes:

displaying a third medicine usage recommendation interface on the graphical user interface according to the health value of the game object and the at least one type of status information as well as the treatment medicine and the status medicine currently carried by the game object, the third medicine usage recommendation interface including a target treatment medicine, a target status medicine and a third recovery control;

in response to a fourth trigger operation acting on the third recovery control, adjusting status information of the game object by using the target status medicine, and increasing the health value of the game object by using the target treatment medicine.

In an embodiment of the present disclosure, the method for controlling a game object further includes:

providing a selection list on the graphical user interface in response to a trigger operation on the graphical user interface, where the selection list at least includes a first medicine usage recommendation interface trigger identification, a second medicine usage recommendation interface trigger identification and a third medicine usage recommendation interface trigger identification;

in response to a selection operation on the selection list, displaying a medicine usage recommendation interface corresponding to the selection operation on the graphical user interface.

The specific details of the apparatus for controlling a game object 2700 have described in detail in the corresponding method for controlling a game object. Therefore, details are not described here again.

It should be noted that although several modules or units of the apparatus for controlling a game object 2700 are mentioned in the above detailed description, such partitioning is not mandatory. In fact, according to embodiments of the present disclosure, the features and functions of two or more modules or units described above may be concretized within one module or unit. Conversely, the features and functions of one module or unit described above may be concretized by further dividing it into a plurality of modules or units.

In addition, in an embodiment of the present disclosure, there is further provided an electronic device capable of implementing the above method.

The electronic device 2800 according to the embodiment of the present disclosure will be described below with reference to FIG. 28. The electronic device 2800 shown in FIG. 28 is only an example, and should not impose any limitations on the function or usage scope of the embodiment of the present disclosure.

Figure 28:
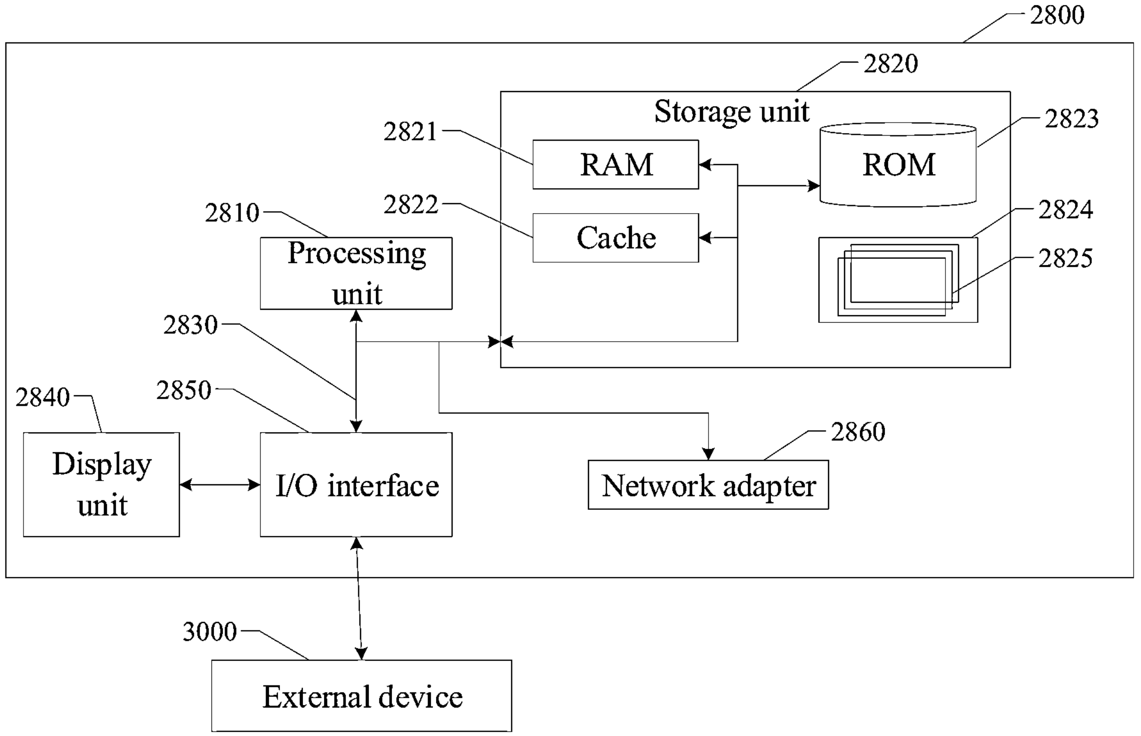
FIG. 28 schematically shows an electronic device for implementing a method for controlling a game object according to an embodiment of the present disclosure.

As shown in FIG. 28, the electronic device 2800 is shown in the form of a general-purpose computing device. The components of the electronic device 2800 may include, but are not limited to: at least one processing unit 2810, at least one storage unit 2820, a bus 2830 connecting different system components (including the storage unit 2820 and the processing unit 2810), and a display unit 2840.

Among them, the storage unit stores with a program code, and the program code may be executed by the processing unit 2810, so that the processing unit 2810 executes the steps according to the various embodiments of the present disclosure described in the foregoing "example method" part of the present description. For example, the method includes:

displaying a first medicine usage recommendation interface on the graphical user interface according to at least one type of status information of the game object and a status medicine currently carried by the game object, the status medicine being used for adjusting status information of the game object, and the first medicine usage recommendation interface including a status icon corresponding to the status information, a target status medicine and a first recovery control, where a status icon corresponding to the target status medicine among the status icon is displayed differentially;

adjusting the status information of the game object by using the target status medicine in response to a first trigger operation acting on the first recovery control.

In some embodiments, displaying a status icon corresponding to the target status medicine among the status icon differentially includes:

determining the target status medicine in the status medicine according to a status medicine recommendation rule;

displaying the status icon corresponding to the target status medicine differentially.

In some embodiments, the status medicine includes a special status medicine and a general status medicine;

determining the target status medicine in the status medicine according to a status medicine recommendation rule includes:

when there is a special status medicine corresponding to the status information, determining the special status medicine as the target status medicine;

when there is no special status medicine corresponding to the status information, determining the general status medicine as the target status medicine.

In some embodiments, displaying the status icon corresponding to the target status medicine differentially includes:

when the target status medicine is a special status medicine, displaying, displaying the status icon corresponding to the target status medicine differentially;

when the target status medicine is a general status medicine, displaying all status icons differentially.

In some embodiments, the target status medicine is in a selected status.

In some embodiments, after displaying the status icon corresponding to the target status medicine among the status icon differentially, the method further includes:

in response to a second trigger operation acting on the target status medicine, canceling differential display of the status icon corresponding to the target status medicine, and adjusting the target status medicine into an unselected status.

In some embodiments, the method further includes:

displaying a second medicine usage recommendation interface on the graphical user interface according to a health value of the game object and a treatment medicine currently carried by the game object, the treatment medicine being used for restoring the health value of the game object, and the second medicine usage recommendation interface including a target treatment medicine and a second recovery control, where the target treatment medicine is in a selected status by default;

in response to a third trigger operation acting on the second recovery control, increasing the health value of the game object by using the target treatment medicine.

In some embodiments, the target treatment medicine is determined according to a treatment medicine recommendation rule.

In some embodiments, the target treatment medicine is determined according to a treatment medicine recommendation rule, which includes:

obtaining a recovery health value of a pending treatment medicine in the treatment medicine currently carried by the game object;

obtaining a total health value by performing calculation on the health value of the game object and the recovery health value, and determining the pending treatment medicine as the target treatment medicine according to the total health value.

In some embodiments, determining the pending treatment medicine as the target treatment medicine according to the total health value includes:

when the total health value is greater than a first health threshold and less than a second health threshold, determining a first medicine quantity of the pending treatment medicine according to the total health value, so as to determine the pending treatment medicine with the first medicine quantity as the target treatment medicine;

when the total health value is greater than or equal to the second health threshold and less than or equal to a third health threshold, determining the pending treatment medicine with a second medicine quantity as the target treatment medicine according to a medicine price of the pending treatment medicine;

when the total health value is greater than the third health threshold, determining a pending treatment medicine as the target treatment medicine according to the recovery health value of the pending treatment medicine.

In some embodiments, determining a first medicine quantity of the pending treatment medicine according to the total health value includes:

in a condition that the total health value is less than the second health threshold, determining the first medicine quantity of the pending treatment medicine when the total health value is maximum.

In some embodiments, determining the pending treatment medicine with a second medicine quantity as the target treatment medicine according to a medicine price of the pending treatment medicine includes:

obtaining a single medicine price of the pending treatment medicine, and determining a pending usage quantity of the pending treatment medicine;

obtaining the medicine price by performing calculation on the single medicine price and the pending usage quantity, and determining the pending treatment medicine with the second medicine quantity as the target treatment medicine according to a lowest medicine price.

In some embodiments, the method further includes:

when the total health value is greater than the first health threshold and less than the second health threshold, or when the total health value is greater than or equal to the second health threshold and less than or equal to the third health threshold, displaying value prompt information corresponding to the total health value;

when the total health value is greater than the third health threshold, obtaining an overflow value by performing calculation on the total health value and the third health threshold, and displaying the overflow value differentially.

In some embodiments, the method further includes:

displaying a third medicine usage recommendation interface on the graphical user interface according to the health value of the game object and the at least one type of status information as well as the treatment medicine and the status medicine currently carried by the game object, the third medicine usage recommendation interface including a target treatment medicine, a target status medicine and a third recovery control;

in response to a fourth trigger operation acting on the third recovery control, adjusting status information of the game object by using the target status medicine, and increasing the health value of the game object by using the target treatment medicine.

In some embodiments, the method further includes:

in response to a trigger operation on the graphical user interface, providing a selection list on the graphical user interface, where the selection list at least includes a first medicine usage recommendation interface trigger identification, a second medicine usage recommendation interface trigger identification and a third medicine usage recommendation interface trigger identification;

in response to a selection operation on the selection list, displaying a medicine usage recommendation interface corresponding to the selection operation on the graphical user interface.

In this way, a first medicine usage recommendation interface is displayed on a graphical user interface, providing an adjustment entry of status information for a player, and improving the method for controlling a game object. Furthermore, status icons corresponding to the status information are displayed in the first medicine recommendation interface, and the target status medicine can be used by the player without considering the corresponding relationship between the status icon and the status information, avoiding the situation of inefficient battlefield decision-making due to the player thinking too long under an emergency battle condition, reducing the waste of the target status medicine caused by the player operating too fast, improving the automation and intelligence level of target status medicine usage, optimizing the player's experience significantly, and improving the returning rate of the player to a certain extent.

The storage unit 2820 may include a readable medium in the form of a volatile memory unit, such as a random access memory unit (RAM) 2821 and/or a cache memory unit 2822, and may further include a read-only memory unit (ROM) 2823.

The storage unit 2820 may also include a program/utility 2824 having a set of (at least one) program modules 2825. Such program module 2825 includes, but is not limited to: an operating system, one or more applications, other program modules, and program data. Each one or some combination of these examples may include an implementation of a network environment.

The bus 2830 may represent one or more of several types of bus structures, including a storage unit bus or a storage unit controller, a peripheral bus, a graphics acceleration port, a processing unit, or a local bus using any bus structure of a variety of bus structures.

The electronic device 2800 may also communicate with one or more external devices 3000 (e.g., a keyboard, a pointing device, a Bluetooth device, etc.), may also communicate with one or more devices that enable a user to interact with the electronic device 2800, and/or communicate with any device (e.g., a router, a modem, etc.) that enables the electronic device 2800 to communicate with one or more other computing devices. Such communication may be performed through an input/output (I/O) interface 2850. Moreover, the electronic device 2800 may also communicate with one or more networks (e.g., a local area network (LAN), a wide area network (WAN), and/or a public network, such as the Internet) through the network adapter 2860. As shown in the drawing, network adapter 2840 communicates with other modules of electronic device 2800 through bus 2830. It should be understood that, although not shown in the drawing, other hardware and/or software modules may be used in conjunction with electronic device 2800, including but not limited to: microcode, device drivers, redundant processing units, external disk drive arrays, RAID systems, tape drivers, and data backup storage systems, etc.

Through the description of the above embodiments, those skilled in the art will readily understand that the example embodiments described here may be implemented by software, or may be implemented by software in combination with necessary hardware. Therefore, the technical solutions according to the embodiments of the present disclosure may be embodied in the form of a software product, and the software product may be stored in a non-volatile storage medium (which may be a CD-ROM, a USB flash disk, a mobile hard disk, etc.) or on a network, including several instructions to enable a computing device (which may be a personal computer, a server, a terminal device, or a network device, etc.) to perform the method according to the embodiments of the present disclosure.

In an embodiment of the present disclosure, there is further provided a computer-readable storage medium storing with a program product capable of implementing the method described in the description. In some possible embodiments, various aspects of the present disclosure may also be implemented in the form of a program product, including program code, and when the program product is running on a terminal device, the program code is used to enable the terminal device to perform the steps according to the various embodiments of the present disclosure described in the foregoing "example method" part of the present description. For example, the method includes:

displaying a first medicine usage recommendation interface on the graphical user interface according to at least one type of status information of the game object and a status medicine currently carried by the game object, the status medicine being used for adjusting status information of the game object, and the first medicine usage recommendation interface including a status icon corresponding to the status information, a target status medicine and a first recovery control, where a status icon corresponding to the target status medicine among the status icon is displayed differentially;

adjusting the status information of the game object by using the target status medicine in response to a first trigger operation acting on the first recovery control.

In some embodiments, displaying a status icon corresponding to the target status medicine among the status icon differentially includes:

determining the target status medicine in the status medicine according to a status medicine recommendation rule;

displaying the status icon corresponding to the target status medicine differentially.

In some embodiments, the status medicine includes a special status medicine and a general status medicine;

determining the target status medicine in the status medicine according to a status medicine recommendation rule includes:

when there is a special status medicine corresponding to the status information, determining the special status medicine as the target status medicine;

when there is no special status medicine corresponding to the status information, determining the general status medicine as the target status medicine.

In some embodiments, displaying the status icon corresponding to the target status medicine differentially includes:

when the target status medicine is a special status medicine, displaying, displaying the status icon corresponding to the target status medicine differentially;

when the target status medicine is a general status medicine, displaying all status icons differentially.

In some embodiments, the target status medicine is in a selected status.

In some embodiments, after displaying the status icon corresponding to the target status medicine among the status icon differentially, the method further includes:

in response to a second trigger operation acting on the target status medicine, canceling differential display of the status icon corresponding to the target status medicine, and adjusting the target status medicine into an unselected status.

In some embodiments, the method further includes:

displaying a second medicine usage recommendation interface on the graphical user interface according to a health value of the game object and a treatment medicine currently carried by the game object, the treatment medicine being used for restoring the health value of the game object, and the second medicine usage recommendation interface including a target treatment medicine and a second recovery control, where the target treatment medicine is in a selected status by default;

in response to a third trigger operation acting on the second recovery control, increasing the health value of the game object by using the target treatment medicine.

In some embodiments, the target treatment medicine is determined according to a treatment medicine recommendation rule.

In some embodiments, the target treatment medicine is determined according to a treatment medicine recommendation rule, which includes:

obtaining a recovery health value of a pending treatment medicine in the treatment medicine currently carried by the game object;

obtaining a total health value by performing calculation on the health value of the game object and the recovery health value, and determining the pending treatment medicine as the target treatment medicine according to the total health value.

In some embodiments, determining the pending treatment medicine as the target treatment medicine according to the total health value includes:

when the total health value is greater than a first health threshold and less than a second health threshold, determining a first medicine quantity of the pending treatment medicine according to the total health value, so as to determine the pending treatment medicine with the first medicine quantity as the target treatment medicine;

when the total health value is greater than or equal to the second health threshold and less than or equal to a third health threshold, determining the pending treatment medicine with a second medicine quantity as the target treatment medicine according to a medicine price of the pending treatment medicine;

when the total health value is greater than the third health threshold, determining a pending treatment medicine as the target treatment medicine according to the recovery health value of the pending treatment medicine.

In some embodiments, determining a first medicine quantity of the pending treatment medicine according to the total health value includes:

in a condition that the total health value is less than the second health threshold, determining the first medicine quantity of the pending treatment medicine when the total health value is maximum.

In some embodiments, determining the pending treatment medicine with a second medicine quantity as the target treatment medicine according to a medicine price of the pending treatment medicine includes:

obtaining a single medicine price of the pending treatment medicine, and determining a pending usage quantity of the pending treatment medicine;

obtaining the medicine price by performing calculation on the single medicine price and the pending usage quantity, and determining the pending treatment medicine with the second medicine quantity as the target treatment medicine according to a lowest medicine price.

In some embodiments, the method further includes:

when the total health value is greater than the first health threshold and less than the second health threshold, or when the total health value is greater than or equal to the second health threshold and less than or equal to the third health threshold, displaying value prompt information corresponding to the total health value;

when the total health value is greater than the third health threshold, obtaining an overflow value by performing calculation on the total health value and the third health threshold, and displaying the overflow value differentially.

In some embodiments, the method further includes:

displaying a third medicine usage recommendation interface on the graphical user interface according to the health value of the game object and the at least one type of status information as well as the treatment medicine and the status medicine currently carried by the game object, the third medicine usage recommendation interface including a target treatment medicine, a target status medicine and a third recovery control;

in response to a fourth trigger operation acting on the third recovery control, adjusting status information of the game object by using the target status medicine, and increasing the health value of the game object by using the target treatment medicine.

In some embodiments, the method further includes:

in response to a trigger operation on the graphical user interface, providing a selection list on the graphical user interface, where the selection list at least includes a first medicine usage recommendation interface trigger identification, a second medicine usage recommendation interface trigger identification and a third medicine usage recommendation interface trigger identification;

in response to a selection operation on the selection list, displaying a medicine usage recommendation interface corresponding to the selection operation on the graphical user interface.

In this way, a first medicine usage recommendation interface is displayed on a graphical user interface, providing an adjustment entry of status information for a player, and improving the method for controlling a game object. Furthermore, status icons corresponding to the status information are displayed in the first medicine recommendation interface, and the target status medicine can be used by the player without considering the corresponding relationship between the status icon and the status information, avoiding the situation of inefficient battlefield decision-making due to the player thinking too long under an emergency battle condition, reducing the waste of the target status medicine caused by the player operating too fast, improving the automation and intelligence level of target status medicine usage, optimizing the player's experience significantly, and improving the returning rate of the player to a certain extent.

Figure 29:
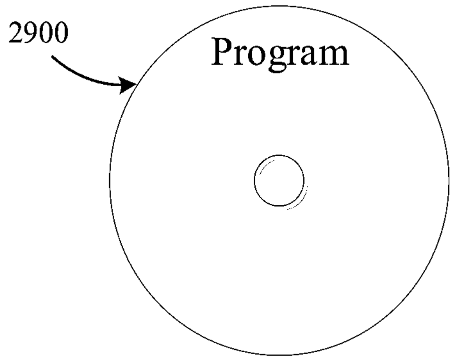
FIG. 29 schematically shows a computer readable storage medium for implementing a method for controlling a game object according to an embodiment of the present disclosure.

Referring to FIG. 29, a program product 2900 for implementing the above method according to the embodiments of the present disclosure is described, which may employ a portable compact disk read-only memory (CD-ROM) and includes program code and may run on a terminal device, such as a personal computer. However, the program product of the present disclosure is not limited to this. In the context, the readable storage medium may be any tangible medium that includes or stores a program that may be used by or in combination with an instruction execution system, an apparatus, or a device.

The program product may employ any combination of one or more readable medium. The readable medium may be a readable signal medium or a readable storage medium. The readable storage medium may be, for example, but not limited to, an electrical, magnetic, optical, electromagnetic, infrared, or semiconductor system, apparatus, or device, or any combination of them. More specific examples of the readable storage medium (non-exhaustive lists) include: an electrical connection with one or more wires, a portable disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above.

The computer-readable signal medium may include a data signal propagated in a baseband or as part of a carrier, where readable program code is carried. Such propagated data signals may take a variety of forms, including, but not limited to, electromagnetic signals, optical signals, or any suitable combination of the above. The readable signal medium may also be any readable medium other than a readable storage medium, and the readable medium may send, propagate, or transmit a program used by or in combination with an instruction execution system, an apparatus, or a device.

The program code included on the readable medium may be transmitted with any suitable medium, including but not limited to wireless, wired, optical cable, RF, etc., or any suitable combination of the above.

The program code for executing the operations of the present disclosure may be written in any combination of one or more programming languages, including object-oriented programming languages, such as Java, C++, etc., also including conventional procedural programming languages, such as "C" language or similar programming languages. The program code may be executed entirely on the user computing device, partly on the user device, as a stand-alone software package, partly on the user computing device and partly on the remote computing device, or entirely on the remote computing device or the server. In situations involving a remote computing device, the remote computing device may be connected to a user computing device through any type of network, including a local area network (LAN) or a wide area network (WAN), or may be connected to an external computing device (for example, utilizing Internet service providers to connect through the Internet).

Other embodiments of the present disclosure will be apparent to those skilled in the art from consideration of the description and practice of the present disclosure. The present disclosure is intended to cover any variations, uses, or adaptations of the present disclosure following the general principles of the present disclosure and including common general knowledge or conventional technical means in the art not disclosed in the present disclosure. The description and examples are considered as examples only, with a true scope and spirit of the present disclosure being indicated by the claims.

What is claimed is:

1. A method for controlling a game object in a game screen output by an electronic device, comprising:

displaying, by the electronic device, a first interface on a graphical user interface provided on a display screen of the electronic device according to at least one type of status information of the game object in the game screen and a status medicine currently carried by the game object in the game screen, wherein the status medicine is used for adjusting status information of the game object in the game screen, and the first interface comprises a first target status medicine, a first recovery control and at least one status icon indicating the status information;

displaying, by the electronic device, a status icon corresponding to the first target status medicine differently from other status icons among the at least one status icon, wherein the first target status medicine is in a selected status; and controlling, by the electronic device, adjustment of the status information of the game object in the game screen by using the first target status medicine in response to a first trigger operation acting on the first recovery control.

2. The method according to claim 1, wherein displaying the status icon corresponding to the first target status medicine differently from other status icons among the at least one status icon comprises:

determining the first target status medicine in the status medicine according to a status medicine recommendation rule; and displaying the status icon corresponding to the first target status medicine differentially.

3. The method according to claim 2, wherein the status medicine comprises a special status medicine and a general status medicine; and wherein determining the first target status medicine in the status medicine according to the status medicine recommendation rule comprises:

determining, in response to presence of a special status medicine corresponding to the status information, the special status medicine as the first target status medicine; and determining, in response to absence of the special status medicine corresponding to the status information, the general status medicine as the first target status medicine.

4. The method according to claim 2, wherein displaying the status icon corresponding to the first target status medicine differentially comprises:

displaying, in response to the first target status medicine being a special status medicine, the status icon corresponding to the first target status medicine differentially; and displaying, in response to the first target status medicine being a general status medicine, all status icons differentially.

5. The method according to claim 1, further comprising:

canceling by the electronic device, in response to a second trigger operation acting on the first target status medicine, differential display of the status icon corresponding to the first target status medicine, and adjusting the first target status medicine into an unselected status.

6. The method according to claim 1, further comprising:

displaying, by the electronic device, a second interface on the graphical user interface according to a health value of the game object and a treatment medicine currently carried by the game object, wherein the treatment medicine is used for restoring the health value of the game object, the second interface comprises a first target treatment medicine and a second recovery control, and the first target treatment medicine is in a selected status by default; and increasing by the electronic device, in response to a third trigger operation acting on the second recovery control, the health value of the game object by using the first target treatment medicine.

7. The method according to claim 6, further comprising:

determining, by the electronic device, the first target treatment medicine according to a treatment medicine recommendation rule.

8. The method according to claim 7, wherein determining the first target treatment medicine according to the treatment medicine recommendation rule comprises:

obtaining a recovery health value of a pending treatment medicine in the treatment medicine currently carried by the game object; and obtaining a total health value by performing calculation on the health value of the game object and the recovery health value, and determining the pending treatment medicine as the first target treatment medicine according to the total health value.

9. The method according to claim 8, wherein determining the pending treatment medicine as the first target treatment medicine according to the total health value comprises at least one of:

determining, in response to the total health value being greater than a first health threshold and less than a second health threshold, a first medicine quantity of the pending treatment medicine according to the total health value, so as to determine the pending treatment medicine with the first medicine quantity as the first target treatment medicine;

determining, in response to the total health value being greater than or equal to the second health threshold and less than or equal to a third health threshold, the pending treatment medicine with a second medicine quantity as the first target treatment medicine according to a medicine price of the pending treatment medicine; or determining, in response to the total health value being greater than the third health threshold, a pending treatment medicine as the first target treatment medicine according to the recovery health value of the pending treatment medicine.

10. The method according to claim 8, wherein determining the first medicine quantity of the pending treatment medicine according to the total health value comprises:

determining, in response to the total health value being less than the second health threshold, the first medicine quantity of the pending treatment medicine when the total health value is maximum.

11. The method according to claim 9, wherein determining the pending treatment medicine with the second medicine quantity as the first target treatment medicine according to the medicine price of the pending treatment medicine comprises:

obtaining a single medicine price of the pending treatment medicine, and determining a pending usage quantity of the pending treatment medicine; and obtaining the medicine price by performing calculation on the single medicine price and the pending usage quantity, and determining the pending treatment medicine with the second medicine quantity as the first target treatment medicine according to a lowest medicine price.

12. The method according to claim 9, further comprising:

displaying by the electronic device, in response to the total health value being greater than the first health threshold and less than the second health threshold, or in response to the total health value being greater than or equal to the second health threshold and less than or equal to the third health threshold, value prompt information corresponding to the total health value; and obtaining by the electronic device, in response to the total health value being greater than the third health threshold, an overflow value by performing calculation on the total health value and the third health threshold, and displaying the overflow value differentially.

13. The method according to claim 6, further comprising:

displaying, by the electronic device, a third interface on the graphical user interface according to the health value of the game object and the at least one type of status information as well as the treatment medicine and the status medicine currently carried by the game object, wherein the third interface comprises a second target treatment medicine, a second target status medicine and a third recovery control; and adjusting by the electronic device, in response to a fourth trigger operation acting on the third recovery control, the status information of the game object by using the second target status medicine, and increasing the health value of the game object by using the second target treatment medicine.

14. The method according to claim 13, further comprising:

providing by the electronic device, in response to a trigger operation on the graphical user interface, a selection list on the graphical user interface, where the selection list at least comprises a first interface trigger identification, a second interface trigger identification and a third interface trigger identification; and displaying by the electronic device, in response to a selection operation on the selection list, an interface corresponding to the selection operation on the graphical user interface.

15. A non-transitory computer-readable storage medium, with a computer program stored thereon, wherein when the computer program is executed by a processor of an electronic device, the electronic device is caused to implement a method for controlling a game object in a game screen output by the electronic device, and the method comprises:

displaying a first interface on a graphical user interface provided on a display screen of the electronic device according to at least one type of status information of the game object in the game screen and a status medicine currently carried by the game object in the game screen, wherein the status medicine is used for adjusting status information of the game object, the first interface comprises a first target status medicine, a first recovery control and at least one status icon indicating the status information;

displaying a status icon corresponding to the first target status medicine differently from other status icons among the at least one status icon, wherein the first target status medicine is in a selected status; and controlling adjustment of the status information of the game object in the game screen by using the first target status medicine in response to a first trigger operation acting on the first recovery control.

16. An electronic device, comprising:

a processor; and a memory, configured to store an executable instruction for the processor;

wherein the processor is configured to execute the executable instruction, to cause the electronic device to:

display a first interface on a graphical user interface provided on a display screen of the electronic device according to at least one type of status information of a game object in a game screen output by an electronic device and a status medicine currently carried by the game object in the game screen, wherein the status medicine is used for adjusting status information of the game object, the first interface comprises a first target status medicine, a first recovery control and at least one status icon indicating the status information;

display a status icon corresponding to the first target status medicine differently from other status icons among the at least one status icon, wherein the first target status medicine is in a selected status; and control adjustment of the status information of the game object in the game screen by using the first target status medicine in response to a first trigger operation acting on the first recovery control.

17. The non-transitory computer-readable storage medium according to claim 15, wherein displaying the status icon corresponding to the first target status medicine differently from other status icons among the at least one status icon comprises:

determining the first target status medicine in the status medicine according to a status medicine recommendation rule; and displaying the status icon corresponding to the first target status medicine differentially.

18. The non-transitory computer-readable storage medium according to claim 15, wherein the method further comprises:

displaying a second interface on the graphical user interface according to a health value of the game object and a treatment medicine currently carried by the game object, wherein the treatment medicine is used for restoring the health value of the game object, the second interface comprises a first target treatment medicine and a second recovery control, and the first target treatment medicine is in a selected status by default; and increasing, in response to a third trigger operation acting on the second recovery control, the health value of the game object by using the first target treatment medicine.

19. The non-transitory computer-readable storage medium according to claim 18, wherein the method further comprises:

displaying a third interface on the graphical user interface according to the health value of the game object and the at least one type of status information as well as the treatment medicine and the status medicine currently carried by the game object, wherein the third interface comprises a second target treatment medicine, a second target status medicine and a third recovery control; and adjusting, in response to a fourth trigger operation acting on the third recovery control, the status information of the game object by using the second target status medicine, and increasing the health value of the game object by using the second target treatment medicine.

* * * * *